United States Patent [19]
Nishiyama et al.

[11] Patent Number: 5,974,233
[45] Date of Patent: Oct. 26, 1999

[54] IMAGE-FORMING SYSTEM

[75] Inventors: Hidetomo Nishiyama, Yamatokoriyama; Syoichiro Yoshiura, Tenri; Yasuhiro Nakai, Soraku-gun, all of Japan

[73] Assignee: Sharp Kabushiki Kaisha, Osaka, Japan

[21] Appl. No.: 08/779,850

[22] Filed: Jan. 7, 1997

[30] Foreign Application Priority Data

Feb. 2, 1996 [JP] Japan .................................. 8-017884

[51] Int. Cl.⁶ .................................................. G06F 15/00
[52] U.S. Cl. ........................................ 395/114; 395/112
[58] Field of Search .................................... 395/114, 112, 395/101, 115, 116, 184.01, 200.47, 200.48; 358/407, 468, 401, 501, 296; 399/8; 345/433, 502; 702/186; 705/400; 382/282, 151

[56] References Cited

U.S. PATENT DOCUMENTS

| | | | |
|---|---|---|---|
| 4,797,706 | 1/1989 | Sugishima et al. | 355/14 |
| 5,333,246 | 7/1994 | Nagasaka | 345/433 |
| 5,337,258 | 8/1994 | Dennis | 702/186 |
| 5,511,156 | 4/1996 | Nagasaka | 345/502 |
| 5,689,755 | 11/1997 | Ataka | 399/8 |

FOREIGN PATENT DOCUMENTS 53116834  10/1978  Japan .

*Primary Examiner*—Dov Popovici
*Attorney, Agent, or Firm*—Dike, Bronstein, Roberts & Cushman, LLP; David G. Conlin

[57] ABSTRACT

A digital copying machine is provided with a control section which, based upon function information and an instruction from an operation panel requesting that desired image process be carried out on image information, selects a digital copying machine and a host computer that are capable of carrying out the desired image process, successively transfers the image information to the respective processing sections of the digital copying machine and the host computer for each image process, and supplies the finally processed image information, which has been returned thereto, to a laser printer section. Further, upon receipt of an instruction from the operation panel requesting that a plurality of image processes be carried out on image information by using a digital copying machine and a host computer in a combined manner, the control section also makes a decision as to which image process should be preferentially carried out, and gives the resulting instruction. Thus, in the case when desired image processes are carried out by using the digital copying machine and the host computer in a combined manner, it is possible to shorten the transfer time, and to operate both of the apparatuses efficiently. As a result, it becomes possible to provide an image-forming system that produces a desired visual image in a short time.

10 Claims, 18 Drawing Sheets

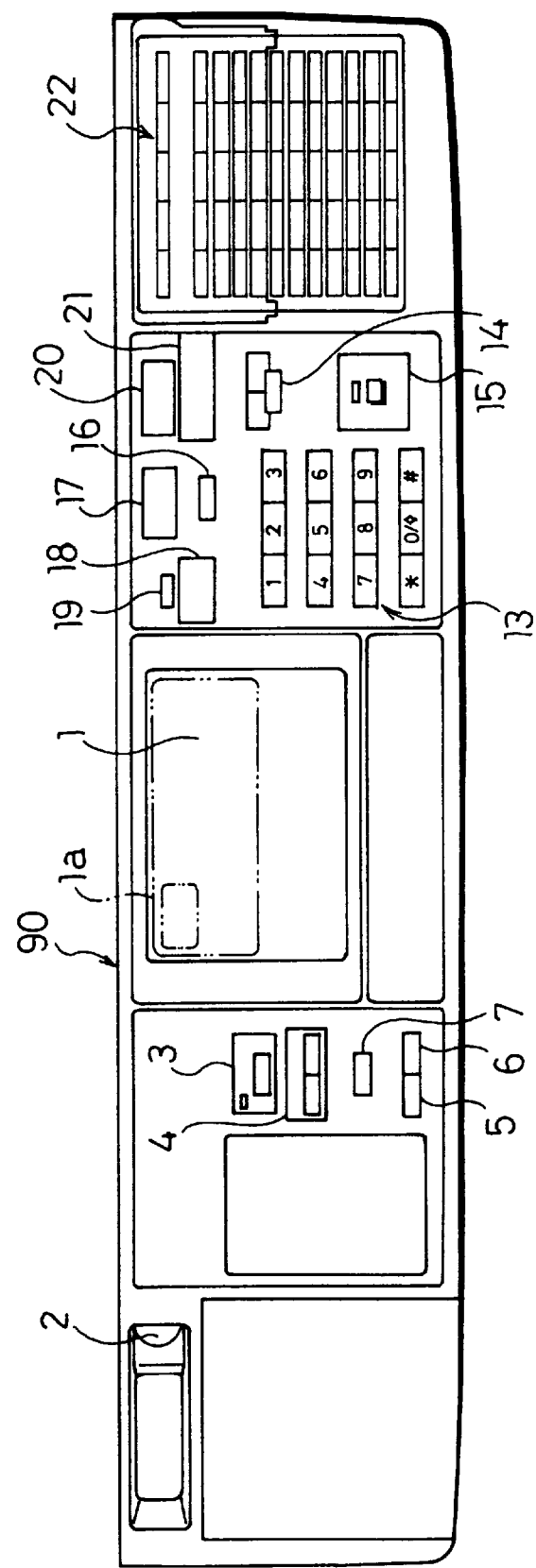

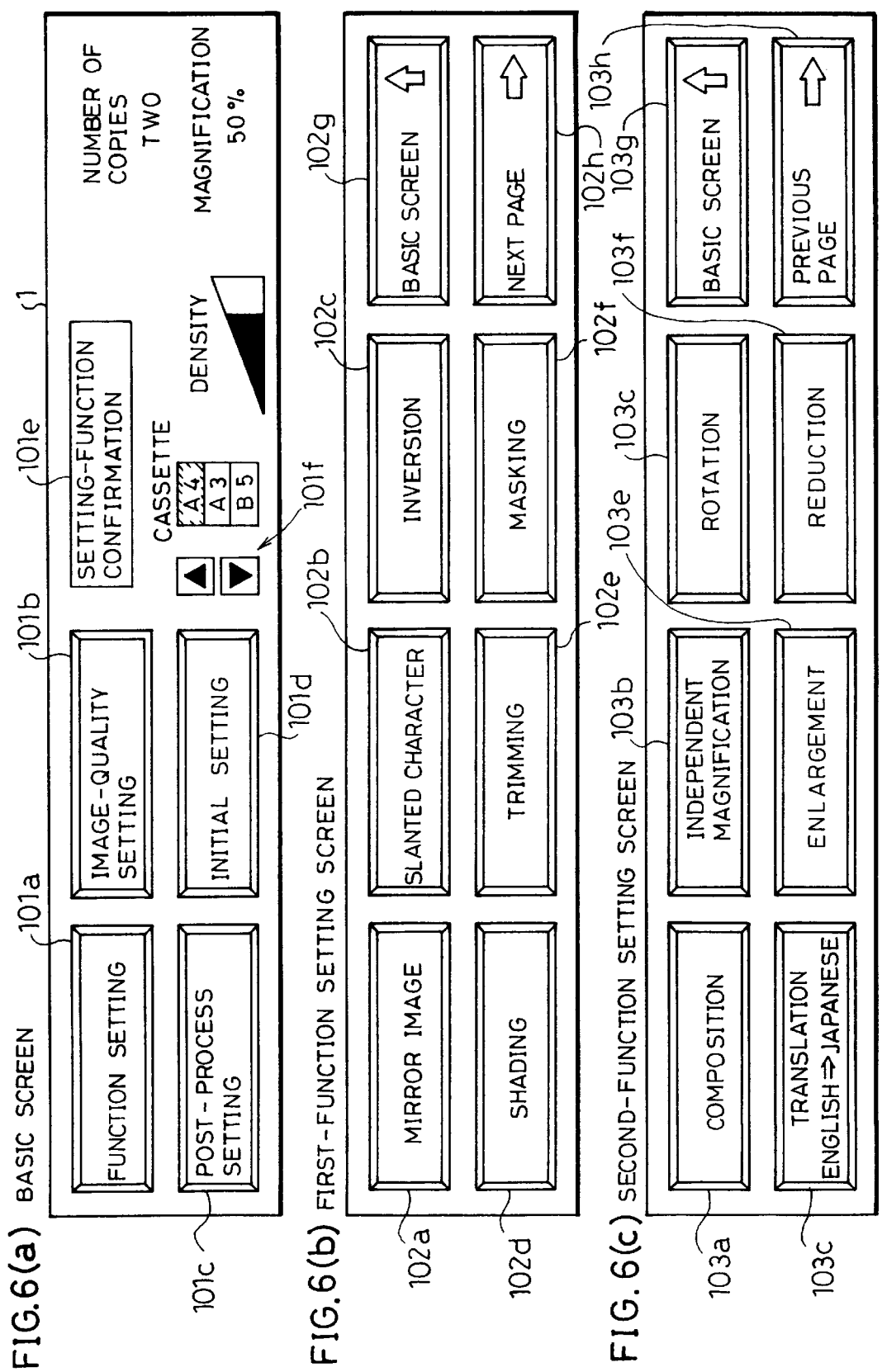

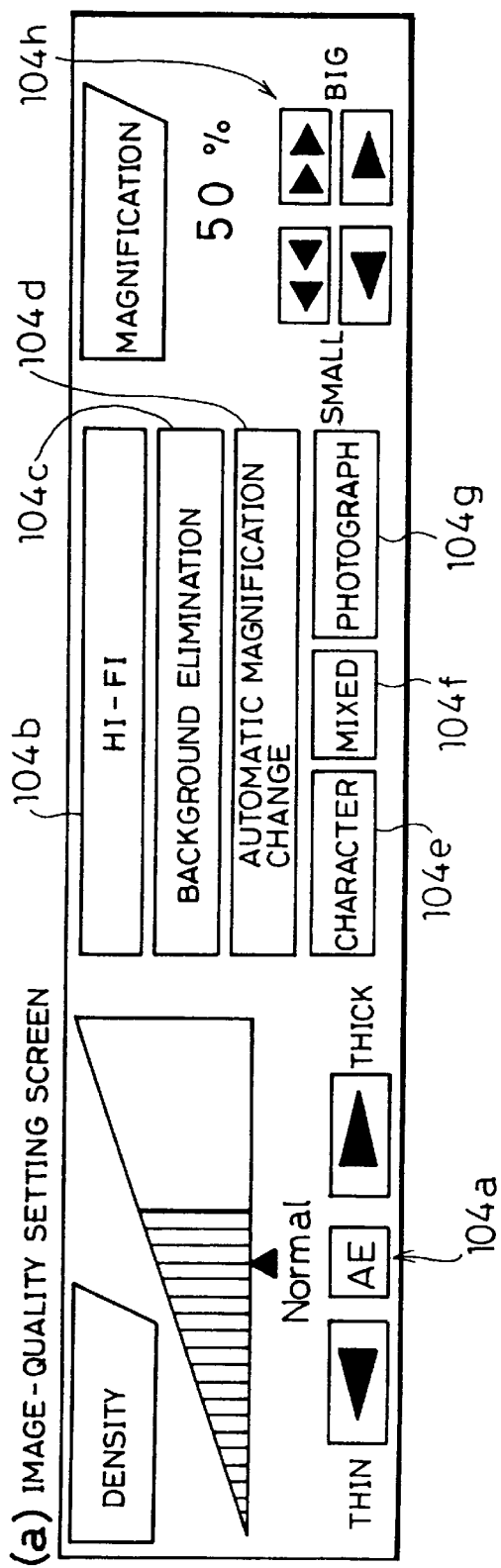
FIG.7(a) IMAGE-QUALITY SETTING SCREEN
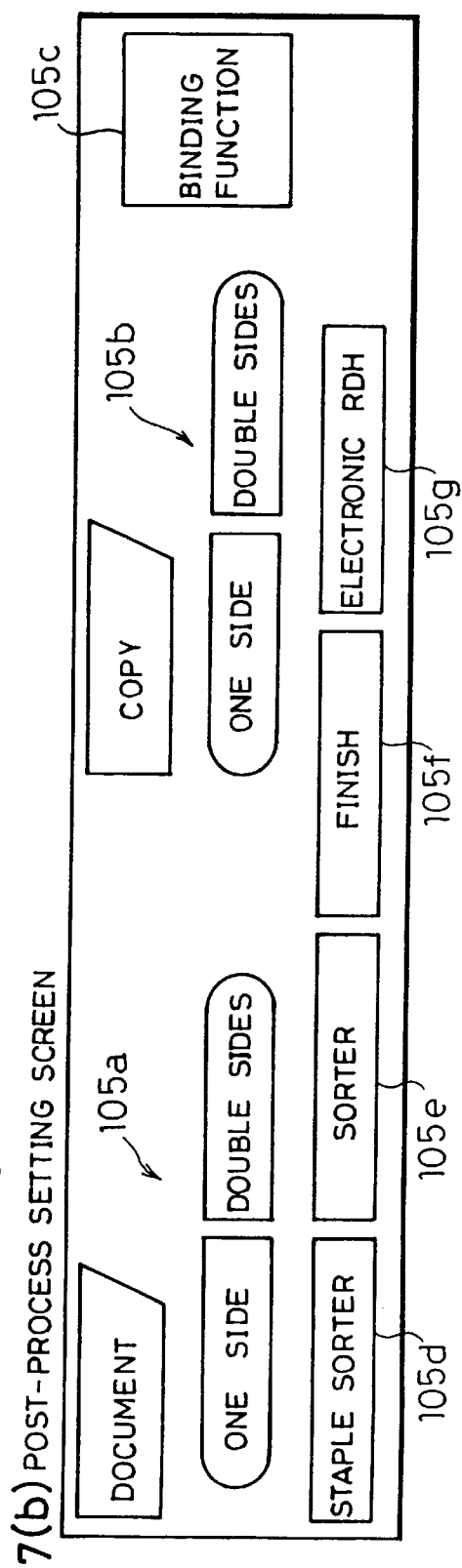
FIG.7(b) POST-PROCESS SETTING SCREEN

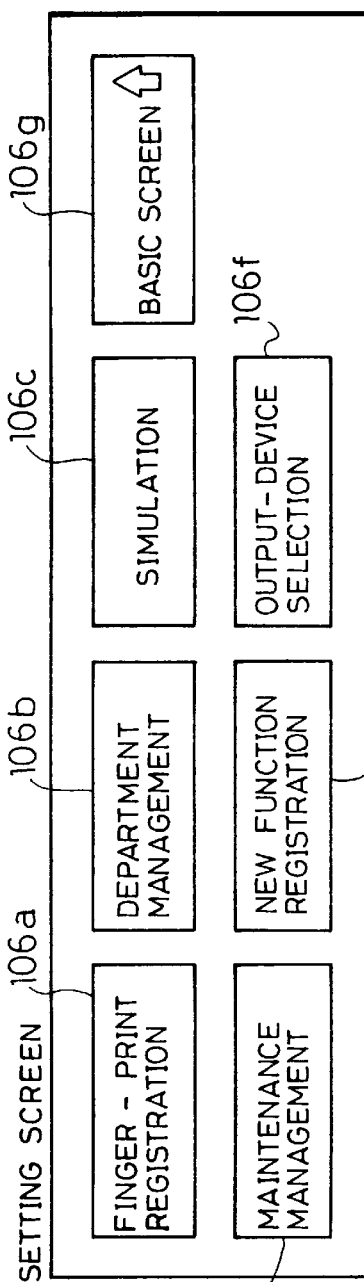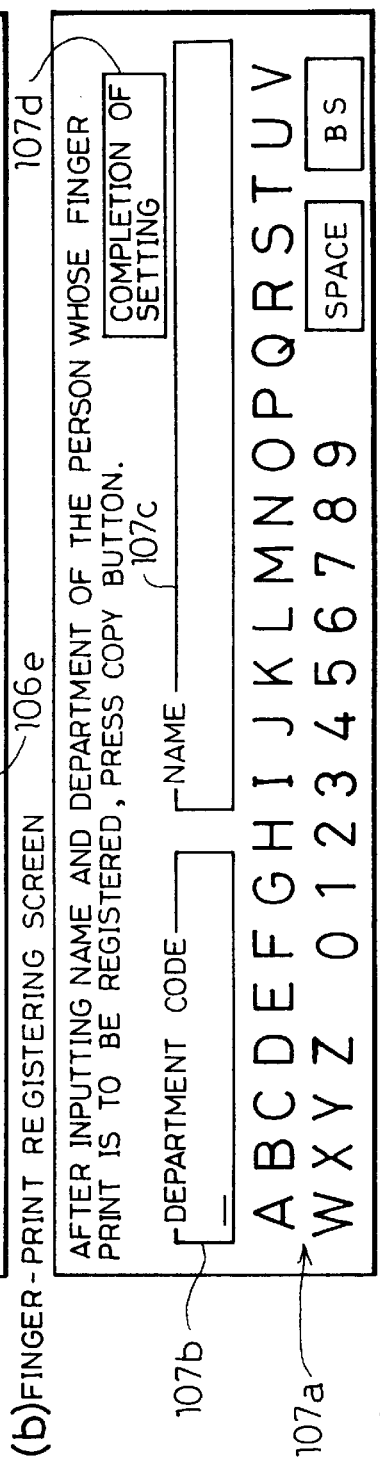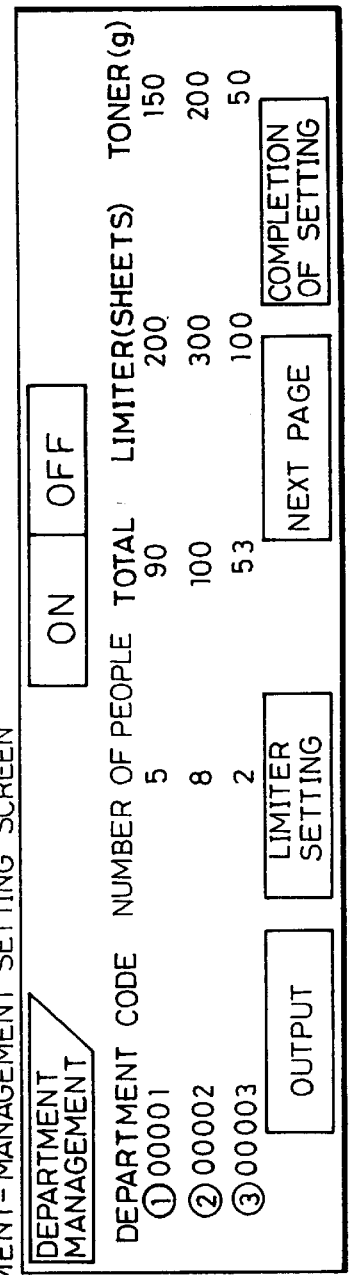

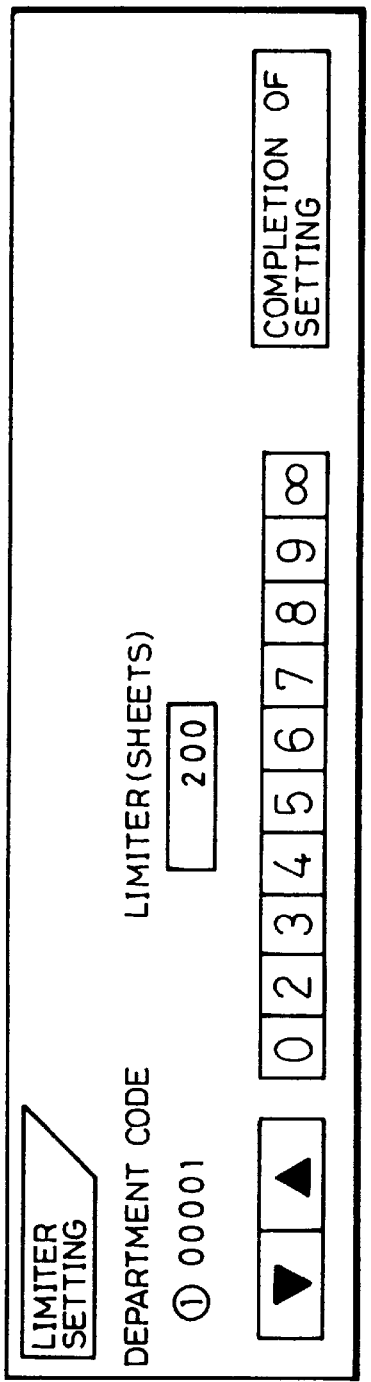
FIG. 9(a) LIMITER SETTING SCREEN
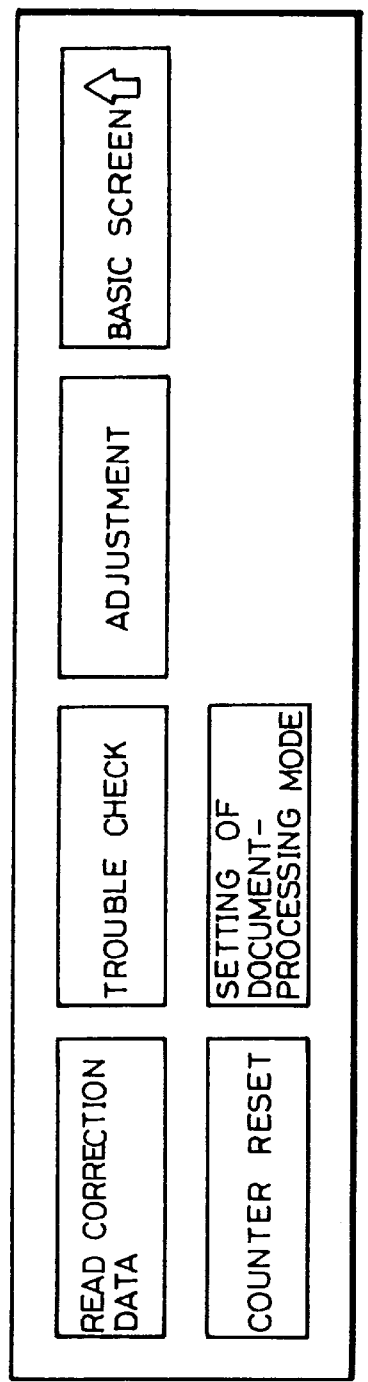
FIG. 9(b) SIMULATION SCREEN

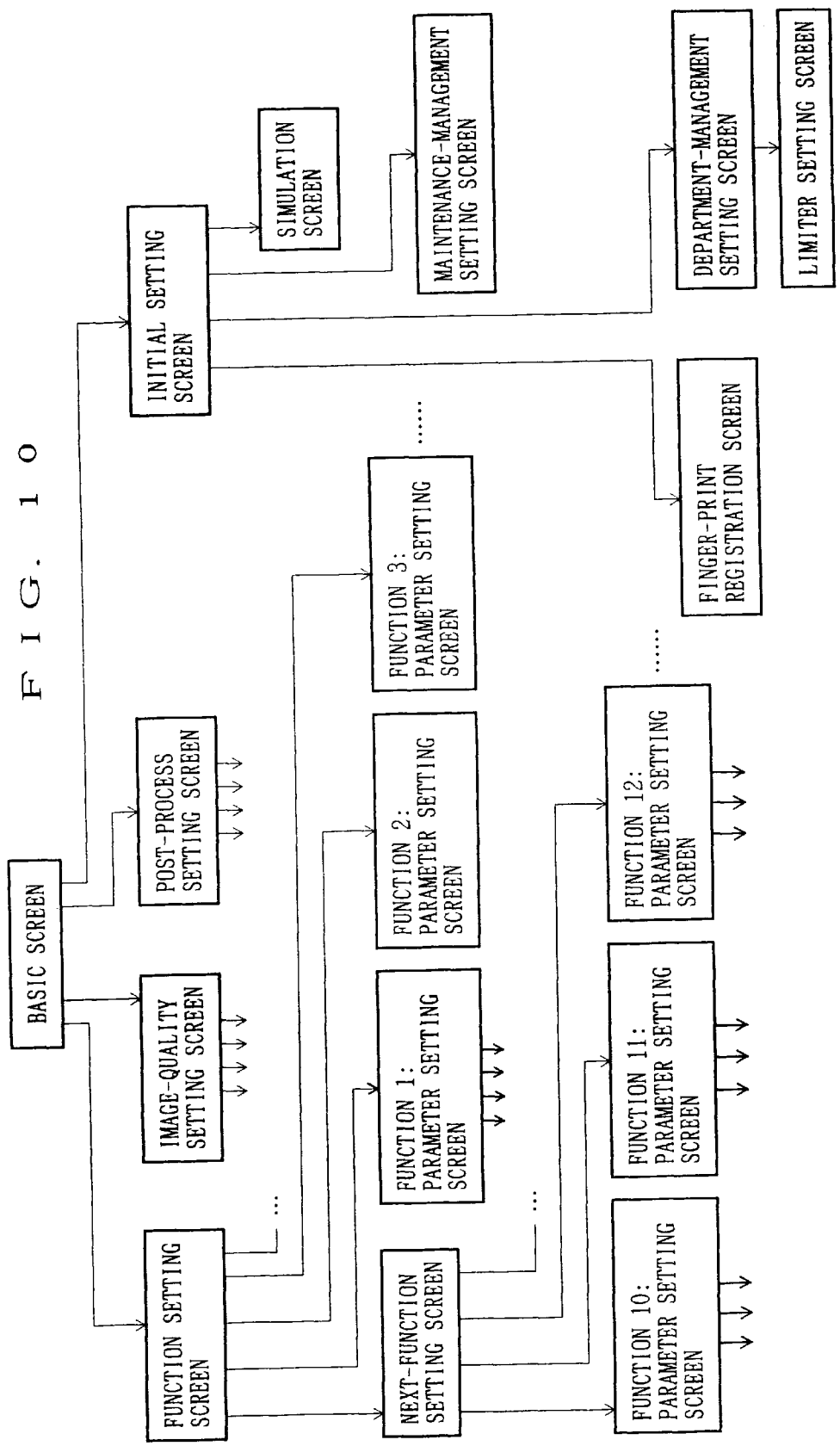

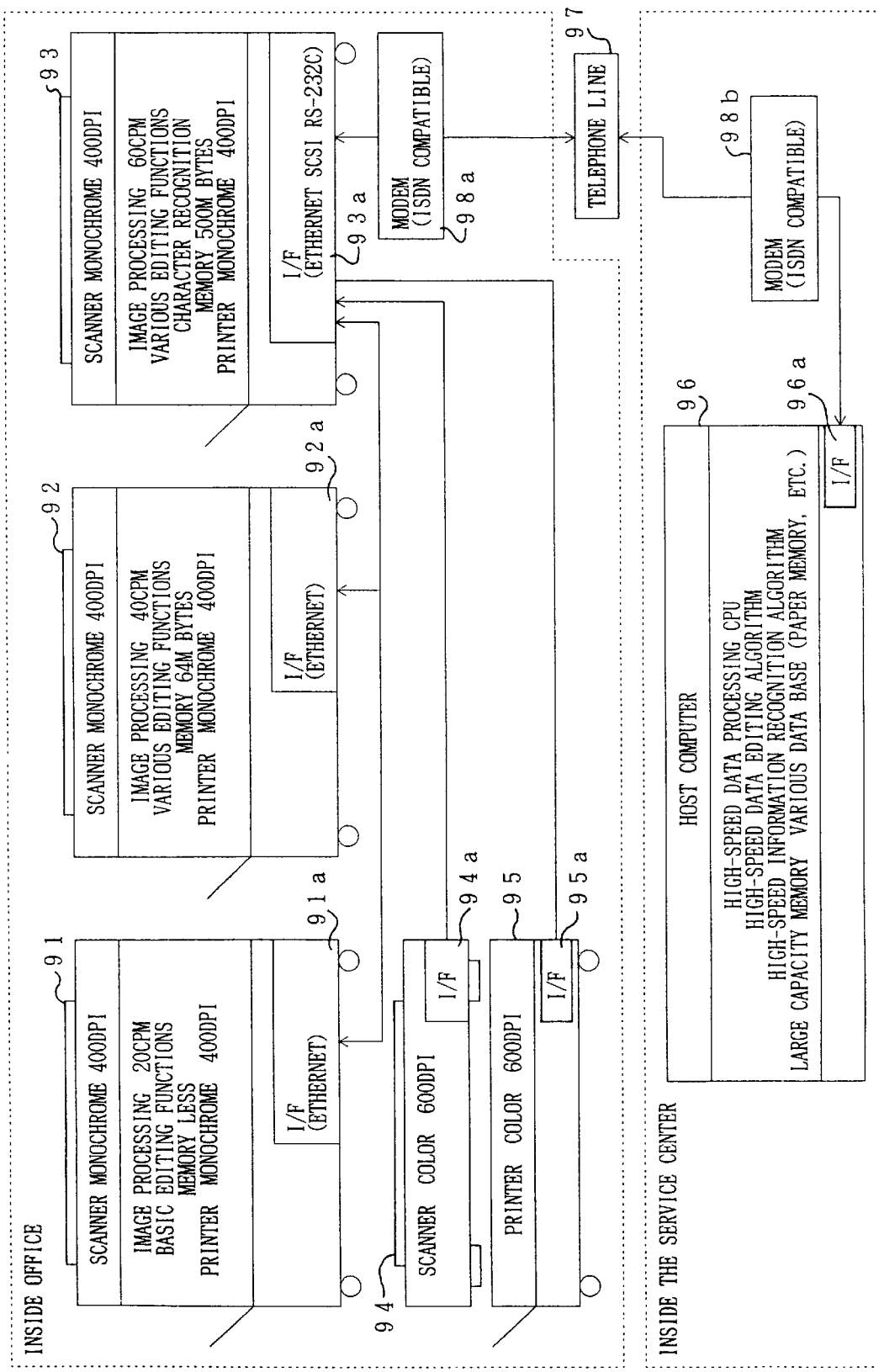

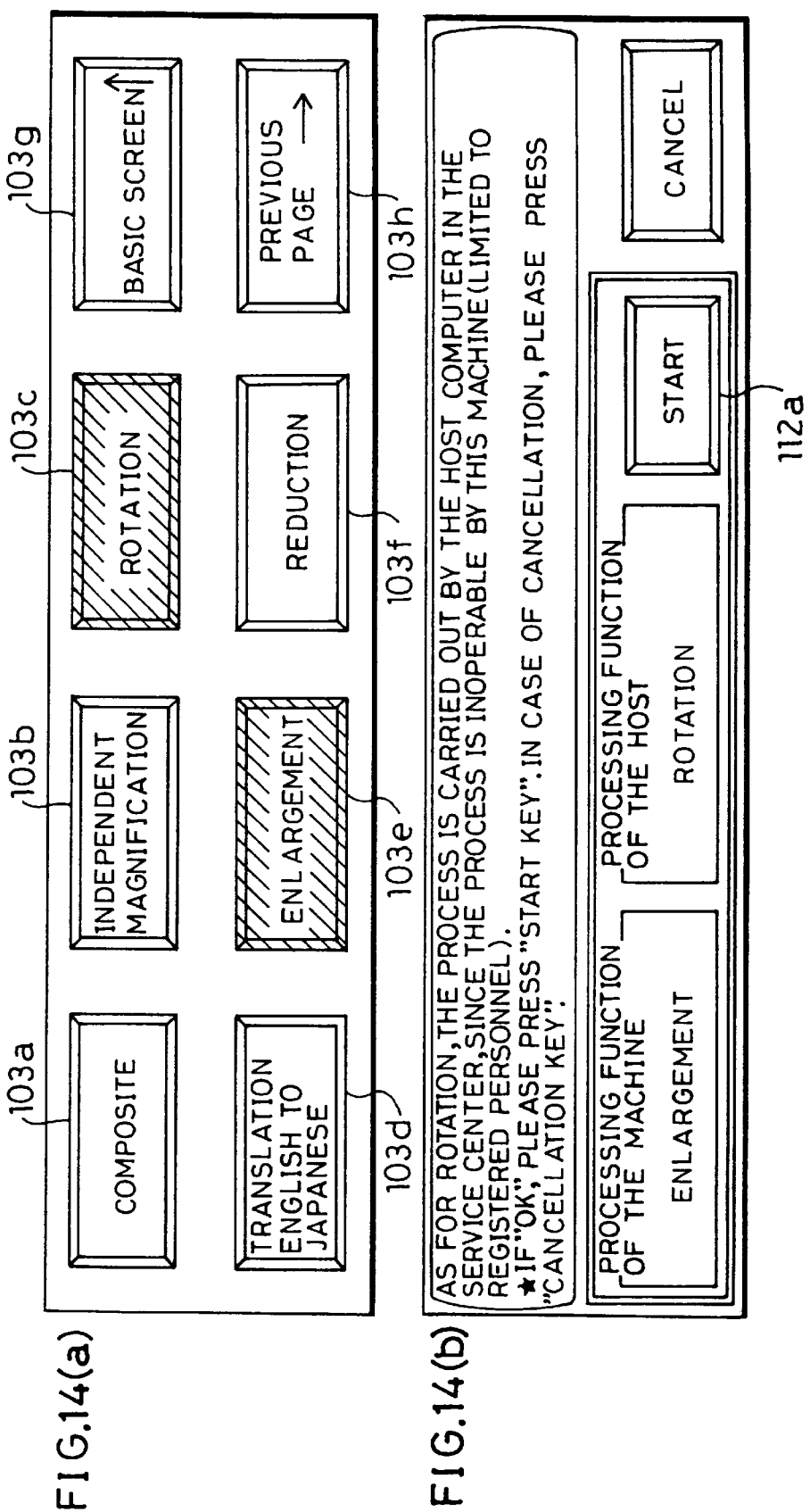

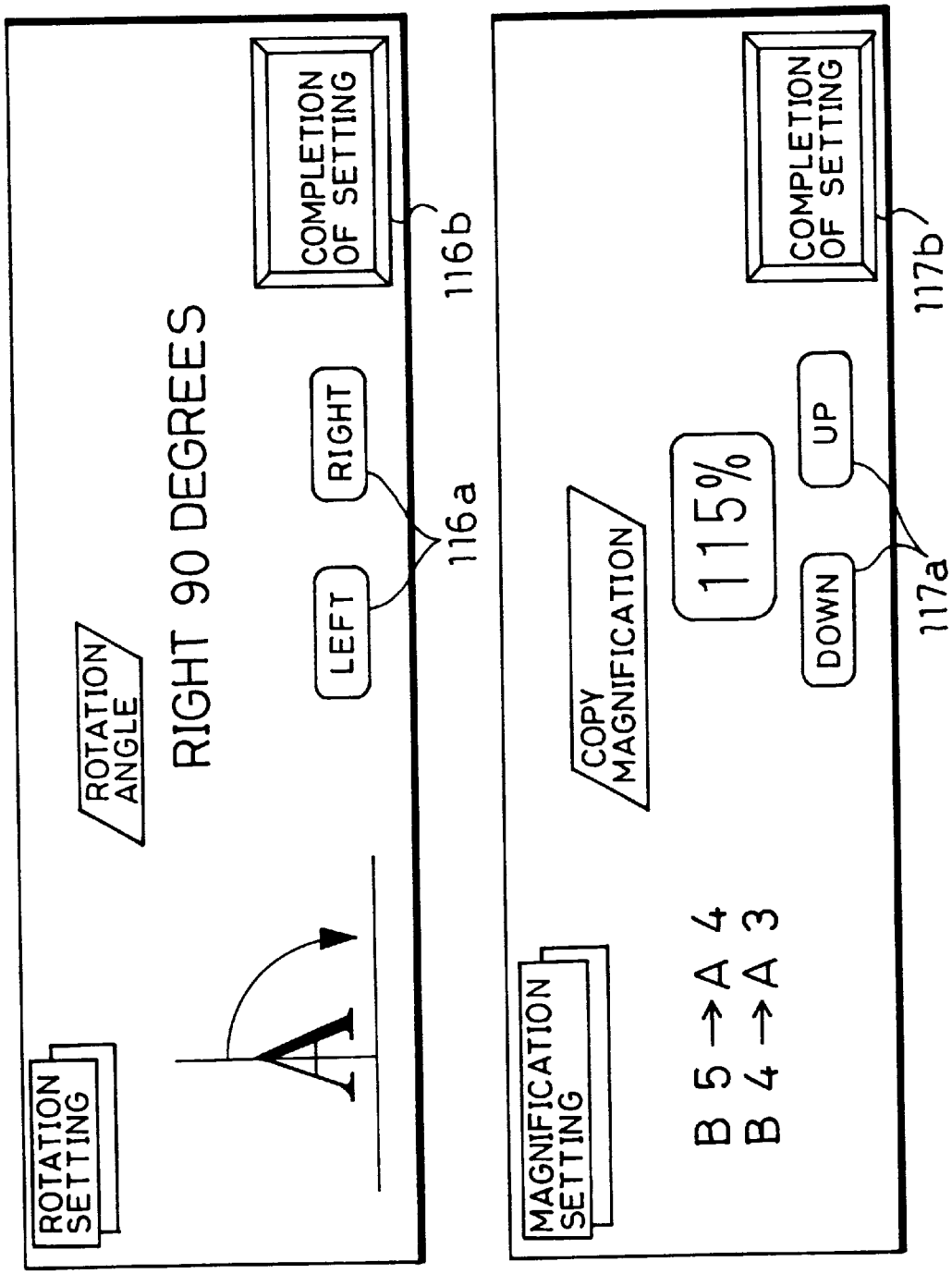

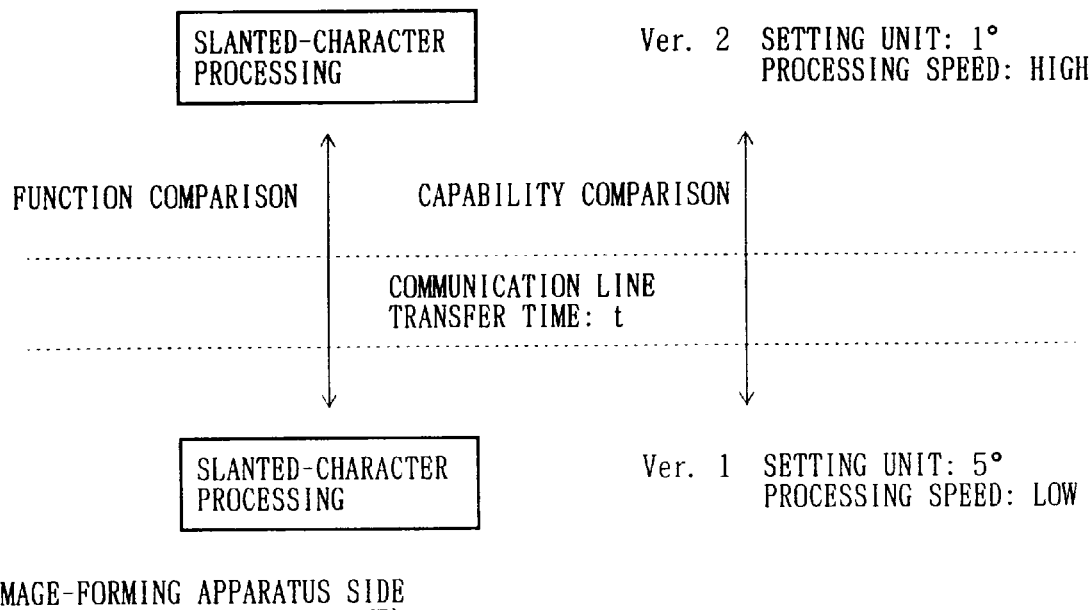

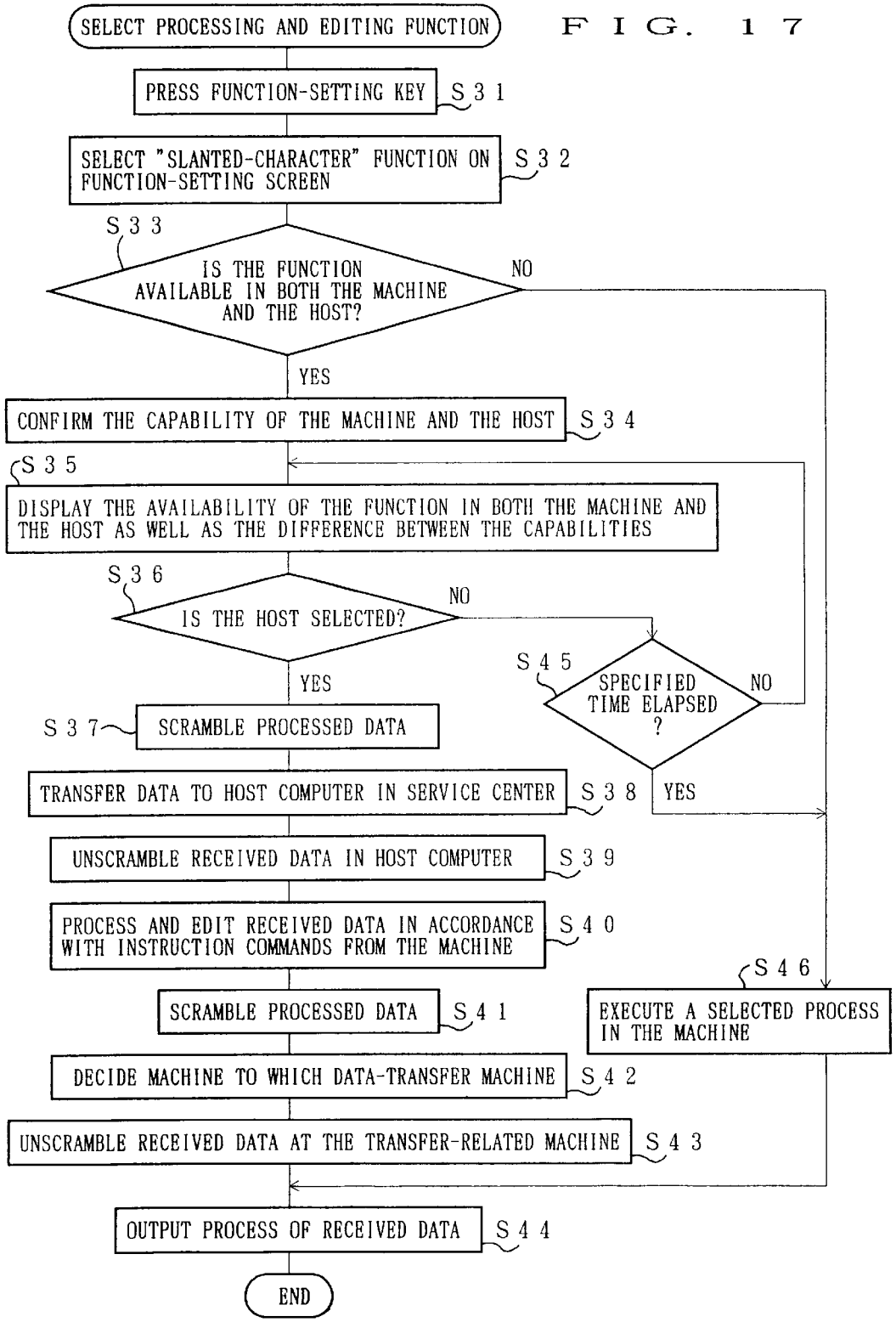

IMAGE-FORMING SYSTEM

FIELD OF THE INVENTION

The present invention relates to an image-forming system that has a plurality of image-forming apparatuses such as digital copying machines and a plurality of image-processing apparatuses such as host computers. In particular, the present invention concerns an image-forming system in which these image-forming apparatuses and image-processing apparatuses are connected to each other through transfer devices.

BACKGROUND OF THE INVENTION

Presently, image-forming apparatuses, such as, for example, digital copying machines, are introduced into the market. In the digital copying machines, a document image is copied as follows: First, the image-reading section reads the document image. Then, the image-processing section carries out specified image-processing on the read document image. Thereafter, the recording section printouts image information which has been subject to the image processing. Therefore, in the digital copying machine of this type, an image is copied onto a sheet of paper by using only the image-processing functions that are provided in the particular digital copying machine.

Here, in recent years, it has been proposed that a plurality of image-recording apparatuses or other apparatuses be organized into a network. For example, Japanese Laid-Open Patent Publication 116834/1978 Tokukaishou 53-116834) discloses an arrangement wherein a plurality of image-reading apparatuses and a plurality of image-recording apparatuses are connected through a control section.

In such an arrangement, an original image that has been read by any of the image-reading apparatuses is printed by any of the image-recording apparatuses. This arrangement makes it possible to shorten the stand-by time of the image-recording apparatus that is caused by processes, such as an exchanging process of originals in the image-reading apparatuses.

Moreover, Japanese Examined Patent Publication 36592/1995 (Tokukouhei 7-36592) discloses an image-forming system wherein a plurality of copying machines, each having an image-reading section and an image-recording section, are connected to a control device. In this image-forming system, an image signal that is to be recorded is supplied to the copying machines in a distributed manner in accordance with a document copying mode that has been set, and copying operations are carried out by the copying machines in parallel with one another.

However, the conventional image-forming systems have the following problems.

Presently, various image-processing functions in the digital copying machine are dependent upon software. Here, with the recent remarkable developments of the software, the image-processing functions have been highly improved in a very short period, and new copying machines having additional unprecedented functions have been newly introduced into the market. Consequently, even when a digital copying machine having desired image-processing functions is purchased, the digital copying machine, which has the highest image-processing functions at the time of the purchase, will soon become outdated with relatively low functions in a short period.

In this case, it is impossible for the purchased digital copying machine to obtain functions higher than those originally provided in the digital copying machine. In the case when higher functions or newer functions are required, it is inevitable that a new copying machine has to be purchased to replace the older one. This tends to impose a big burden on users on an economic basis, and also to present an inherent problem for makers that try to provide consumers with new merchandise.

In order to solve these problems, an image-forming system in which, for example, the following processes are carried out has been proposed; this system will eliminate the need for the purchase of a new machine, and will provide an optimal system. In other words, any of the copying machines reads a document image, and the read document image is subject to image processing by another copying machine. In this case, processed image information, obtained from the copying machine that has carried out the image processing, is again returned to the copying machine or other device which read the document image. Then the copying machine in question printouts the processed image information.

In contrast, the aforementioned prior art system has a problem in that, although the copying machine which has carried out image processing can printouts the processed image information, the copying machine or other device which read the document image cannot printout the processed image information returned again thereto.

Moreover, when desired image processing is carried out by the current machine, the amount of processed image information sometimes becomes larger than that of the image information before the image processing. Therefore, in the case when image information is transferred to a plurality of machines, and image processing is carried out by using those machines in a combined manner, if image processing is carried out indiscriminately in the current machine, it sometimes takes a lot of time to transfer the image information. Furthermore, since the respective machines have their own degrees of image-processing performances, if image information is transferred to a certain machine indiscriminately, the image processing rather tends to take longer. The resulting problem is an inefficiency of the entire image-forming system.

SUMMARY OF THE INVENTION

The present invention has been devised to solve the above-mentioned prior art problems, and its objective is to provide an image-forming system wherein, when the user carries out desired image processing by using his or her machine and other image-processing apparatuses in a combined manner or in a selected manner, a desired visual image is obtained in a short time by efficiently operating respective image-forming apparatuses and image-processing apparatuses.

In order to achieve the above-mentioned objective, an image-forming system of the present invention, which has at least one image-forming apparatus and at least one image-processing system as well as a transfer device that allows both of the apparatuses to communicate with each other so as to transfer information between them, is characterized in that: the image-forming apparatus is provided with an image-recording section for forming a visible image based on image information; a processing section for carrying out predetermined image processing on image information; an input section for inputting an instruction with respect to image processing; a transfer control section that maintains function information indicating types of image processes that are available in the image-forming apparatus and image-processing apparatus, selects image-forming apparatuses and image-processing apparatuses capable of performing the predetermined image processing based on the function information and the instruction from the input section that instructs to carry out the predetermined image processing on the image information, and successively transfers the image information to the processing section of the image-forming apparatus or the image-processing apparatus for each image process, as well as supplying the image-recording section with the finally processed image information that has been returned thereto; and a processing-preference decision means which, upon receipt of an instruction from the input section instructing a plurality of image processes by using the image-forming apparatus and image-processing apparatus in a combined manner with respect to image information, decides which image process is preferentially carried out, and gives the resulting instruction to the transfer control section. This system is also characterized in that: the image-processing apparatus is provided with a processing section which subjects the image information that has been inputted through the transfer device to predetermined image processing, and returns the resulting processed image information to the image-forming apparatus through the transfer device.

In this arrangement, image information is obtained by, for example, a scanner that is installed in the image-forming apparatus so as to read a document image. In this case, if a plurality of image processes are specified for the image information, the processing section in an image-forming apparatus, such as, for example, a digital copying machine, and the processing section in an image-processing apparatus, such as, for example, a host computer, are used to carry out the respective image processes.

In other words, when the user operates the input section to give an instruction so that predetermined image processing is carried out on the image information, the transfer control section selects an image-forming apparatus and an image-processing apparatus that are capable of carrying out the predetermined image processing. Then, the image information is successively transferred to the processing section of the image-forming apparatus or the image-processing apparatus for each image process.

The processing section of the image-processing apparatus, which has received the request for the process, carries out the predetermined image processing on the image information. The processed image information is returned to the image-forming apparatus that originally made the request, through the transfer device. Then, the processing section of the image-forming apparatus to which the processed image information has been returned carries out the next image processing on the processed image information, if necessary. After completion of the image processing, the finally processed image information is supplied to the image-recording section, and the image-recording section outputs a visual image.

In contrast, if the first image processing has been carried out in the processing section of the image-forming apparatus, the processed image information is then transferred to the image-processing apparatus. Thus, the processing section of the image-processing apparatus carries out the next image processing on the processed image information. Thereafter, the image-processing apparatus returns the processed image information to the image-forming apparatus that originally made the request, through the transfer device. The returned image information is supplied to the image-recording section as the finally processed image information, and outputted therefrom.

Here, in the above-mentioned image-forming system, when an instruction is given to an image-forming apparatus and an image-processing apparatus through the input section so that a plurality of image processes are carried out on image information, the transfer control section selects a proper apparatus. In this case, the processing-preference decision means makes a decision as to which image processing should be preferentially made, and the resulting decision is given to the transfer control section.

More specifically, there are two cases depending on the contents of image processing: the amount of the processed image information becomes greater than that of the image information before the processing, and it becomes smaller than that of the image information before the processing. In the case when a plurality of image processes are carried out by using several machines in a combined manner, if the processes are erroneously carried out in the sequence, it takes more time to transfer the image information. In particular, when the information is transferred to an external machine by using a transfer device, such as public lines, the delay also causes disadvantages on an economic basis.

However, in the present invention the processing-preference decision means properly decides the order of preference as described above. Therefore, with the above-mentioned arrangement, when the user carries out a plurality of desired image processes by using an image-forming apparatus and an image-processing apparatus in a combined manner, it is possible to shorten the transferring time between the image-forming apparatus and the image-processing apparatus. Further, since this arrangement allows the image-forming apparatus and the image-processing apparatus to operate efficiently, it becomes possible to provide an image-forming system which produces a desired visual image in a short time.

Moreover, it is more preferable to design the processing-preference decision means so that it makes a decision as to whether the amount of data after the processing exceeds the amount of data prior to the processing or it goes below the amount of data prior to the processing if certain image processing has been carried out in the processing section of the image-forming apparatus, and if the decision is deemed "a decrease in the amount of data", gives an instruction to the transfer control section so that the predetermined image processing is preferentially carried out in the processing section of the image-forming apparatus, and thereafter, the resulting processed image information is transferred to the image-processing apparatus where other image processes are carried out.

In the above-mentioned arrangement, in the case when a plurality of image processes are carried out by using an image-forming apparatus and an image-processing apparatus in a combined manner, when the process-preference decision means makes a decision that a certain process, such as, for example, a "reduction" process, causes a decrease in the amount of data if it is carried out in the image-forming apparatus, the processing-preference decision means gives an instruction to the transfer control section as described below: In other words, the processing-preference decision means gives an instruction to the transfer control section so that the above-mentioned image process is preferentially carried out in the processing section in the image-forming apparatus, and so that the processed image information is then transferred to the image-processing apparatus so as to allow it to carry out other image processes, such as, for example, a "rotation" process.

Therefore, since the image information, whose amount of data has been reduced, is transferred to the image-processing apparatus through the transfer device, the transferring time is positively shortened. That is, the transferring time is positively shortened as compared with the case in which: the image information is first transferred to the image-processing apparatus; a process, such as a "rotation" process, is carried out by the image-processing apparatus; and the data that has been subject to the "rotation" process is further subject to a "reduction" process.

As described above, since the above-mentioned arrangement minimizes the amount of data to be transferred, it is possible to positively shorten the transferring time. Moreover, since the amount of data to be transferred is kept at a minimum, the amount of memory use in the external image-processing apparatus can be minimized, thereby making it possible to provide an efficient image-forming system.

Furthermore, it is more preferable to design the processing-preference decision means so that it makes a decision as to whether the amount of data after the processing exceeds the amount of data prior to the processing or it goes below the amount of data prior to the processing if certain image processing has been carried out in the processing section of the image-forming apparatus, and if the decision is deemed "an increase in the amount of data", gives an instruction to the transfer control section so that the image information is transferred to the image-processing apparatus where other processing is first carried out, and the resulting processed image information is transferred to the image-forming apparatus where the predetermined image processing is carried out on the returned image information in the processing section thereof.

In the above-mentioned arrangement, in the case when a plurality of image processes are carried out by using an image-forming apparatus and an image-processing apparatus in a combined manner, when the process-preference decision means makes a decision that a certain process, such as, for example, an "enlargement" process, causes an increase in the amount of data if it is carried out in the image-forming apparatus, the processing-preference decision means gives an instruction to the transfer control section as described below: In other words, the processing-preference decision means gives an instruction to the transfer control section so that the above-mentioned image process is first transferred to the image-processing apparatus so as to allow it to carry out other image processes, such as, for example, a "rotation" process, and so that the processed image information is then transferred to the image-forming apparatus where the image processing, such as an "enlargement" process, is carried out on the returned image information in the processing section thereof.

In the case when a plurality of image processes are carried out, if a process, such as an "enlargement" process, is first carried out in the image-forming apparatus, the amount of data that is to be transferred to the image-processing apparatus increases. This prolongs the transferring time.

In contrast, with the above-mentioned arrangement, in such a case when the amount of data that is to be transferred is expected to increase, the image information is first transferred to the image-processing apparatus where a process, such as a "rotation" process, is carried out. Thereafter, the image information that has been subject to the "rotation" process is transferred to the image-forming apparatus, and a process, such as an "enlargement" process, is carried out on the image information in the image-forming apparatus. Thus, the transferring time is positively shortened as compared with the case in which a process, such as an "enlargement" process, is first carried out in the image-forming apparatus.

Therefore, since the above-mentioned arrangement minimizes the amount of data to be transferred, it is possible to shorten the transferring time, and also to minimize the amount of memory use in the external image-processing apparatus; thus, it becomes possible to provide an efficient image-forming system.

Moreover, another image-forming system of the present invention, which has at least one image-forming apparatus and at least one image-processing system as well as a transfer device that allows both of the apparatuses to communicate with each other so as to transfer information between them, is characterized in that: the image-forming apparatus is provided with an image-recording section for forming a visible image based on image information; a processing section for carrying out predetermined image processing on image information; an input section for inputting an instruction with respect to image processing; a transfer control section that maintains function information indicating types of image processes that are available in the image-forming apparatus and image-processing apparatus and capability information about the functions, selects image-forming apparatuses and image-processing apparatuses capable of performing the predetermined image processing based on the function information and capability information as well as the instruction from the input section that instructs to carry out the predetermined image processing on the image information, and transfers the image information to the processing section of the image-forming apparatus or the image-processing apparatus for each image process, as well as supplying the image-recording section with the processed image information that has been returned thereto; and a capability-judging means which, upon receipt of an instruction from the input section instructing a predetermined image process with respect to the image information, makes a judgement as to the image-processing capability of the processing section of the image-forming apparatus or the image-processing apparatus based on the capability information, and gives an instruction to the transfer control section as to which processing section should be used to carry out the predetermined image process, the one in the image-forming apparatus or the one in the image-processing apparatus. This system is also characterized in that: the image-processing apparatus is provided with a processing section which subjects the image information that has been inputted through the transfer device to predetermined image processing, and returns the resulting processed image information to the image-forming apparatus through the transfer device.

In the above-mentioned arrangement, image information is obtained by, for example, a scanner that is installed in the image-forming apparatus so as to read a document image. Here, either the image-processing section of the image-forming apparatus such as, for example, a digital copying machine or the image-processing section of the image-processing apparatus such as, for example, a host computer is selected so as to carry out the image process with respect to the image information.

In other words, when the user operates the input section to give an instruction so that desired image processing is carried out on the image information, the transfer control section selects the image-forming apparatus or the image-processing apparatus that is capable of carrying out the desired image processing. Then, the image information is successively transferred to the processing section of the image-forming apparatus or the image-processing apparatus for each image process.

The image-forming apparatus or the image-processing apparatus, which has received the request for the processing, carries out the desired image processing on the image information in its processing section. Here, if the user requests that, for example, the image-processing apparatus should carry out another processing, the image information is transferred to the image-processing apparatus through a transfer device such as, for example, public lines. Then, the processed image information is returned to the image-forming apparatus that originally made the request, through the transfer device. Further, the processed image information is supplied to the image-recording section in the image-forming apparatus, and the image-recording section print-outs the image information as a visual image.

In the present arrangement, when selection is made as to which is used to carry out the desired image processing on the image information, the image-forming apparatus or the image-processing apparatus, the capability-judging means makes a judgement as to the image-processing capability of the processing section of the image-forming apparatus or the image-processing apparatus based on the capability information. Then, the capability-judging means gives an instruction to the transfer control section as to which processing section should be used to carry out the image processing, the one in the image-forming apparatus or the one in the image-processing apparatus.

For this reason, even in the case when both of the image-forming apparatus, which is a machine at hand, and the image-processing apparatus have the desired processing function, one of the apparatuses that has a higher image-processing capability is selected, and the image processing is carried out in the selected apparatus. Therefore, when either the image-forming apparatus or the image-processing apparatus is used to carry out desired image processing, the image-forming apparatus or the image-processing apparatus is efficiently operated; thus, it is possible to provide an image-forming system that produces a desired visual image in a short time.

Further, the above-mentioned capability information may preferably include processing-speed information about the image-processing in each processing section, and the capability-judging means gives an instruction to the transfer control section as to which processing section should be used to carry out the image processing, the one in the image-forming apparatus or the one in the image-processing apparatus, in accordance with an instruction from the input section that is based upon the processing-speed information about the image-processing.

With this arrangement, when desired image processing is requested, it is possible to select either the image-forming apparatus or the image-processing apparatus that has a faster processing speed. Consequently, it becomes possible to positively obtain a desired visual image in a short time.

For a fuller understanding of the nature and advantages of the invention, reference should be made to the ensuing detailed description taken in conjunction with the accompanying drawings.

BRIEF DESCRIPTION OF THE DRAWINGS

FIG. 5 is a front view of an operation panel that is attached to the digital copying machine.

FIG. 6($a$) is an explanatory view that shows a basic screen of a liquid crystal display on the operation panel; FIG. 6($b$) is an explanatory view that shows a first-function setting screen of the liquid crystal display thereon; and FIG. 6($c$) is an explanatory view that shows a second-function setting screen of the liquid crystal display thereon.

FIG. 7($a$) is an explanatory view that shows a picture-quality setting screen of the liquid crystal display on the operation panel; and FIG. 7($b$) is an explanatory view that shows a post-process-setting screen of the liquid crystal display thereon.

FIG. 8($a$) is an explanatory view that shows an initial setting screen of the liquid crystal display on the operation panel; FIG. 8($b$) is an explanatory view that shows a finger-print registering screen of the liquid crystal display thereon; and FIG. 8($c$) is a section-management setting screen of the liquid crystal display thereon.

FIG. 9($a$) is an explanatory view that shows a limiter setting screen of the liquid crystal display on the operation panel; and FIG. 9($b$) is an explanatory view that shows a simulation screen of the liquid crystal display thereon.

FIG. 10 is an explanatory view that shows processes in which the respective screens transfer to other screens in the liquid crystal display on the operation panel.

FIG. 11 is an explanatory drawing that shows a schematic construction of the above-mentioned image-forming system.

FIG. 14($a$) is a front view that shows a display state in which "enlargement" and "rotation" processes are selected in the second-function setting screen shown in FIG. 6($c$) and FIG. 14($b$) is a front view that shows a display screen of the liquid crystal display that corresponds to the operation at S4 shown in FIG. 1.

FIG. 15($a$) is a front view that shows display contents of a rotation-setting screen in the liquid crystal display on the operation panel; and FIG. 15($b$) is a front view that shows display contents of a magnification-setting screen in the liquid crystal display.

FIG. 16, which shows an image-forming system of another embodiment of the present invention, is an explanatory drawing that shows the processing capability of each apparatus on the outer side and inner side.

FIG. 17 is a flow chart that shows operations of the above-mentioned image-forming system.

FIG. 18($b$) is a front view that shows a display screen of the liquid crystal display that corresponds to the operation at S35 shown in FIG. 17; and FIG. 18($c$) is a front view that shows display contents of a slanted-character setting screen in the above-mentioned display apparatus.

DESCRIPTION OF THE EMBODIMENT

[Embodiment 1]

Referring to FIGS. 1 through 15, the following description will discuss one embodiment of the present invention. The present image-forming system has an arrangement in which a digital copying machine, which functions as an image-forming apparatus, and an image-processing apparatus are connected to each other by a transfer device that functions as a means for making communications using digital image information.

Figure 2:
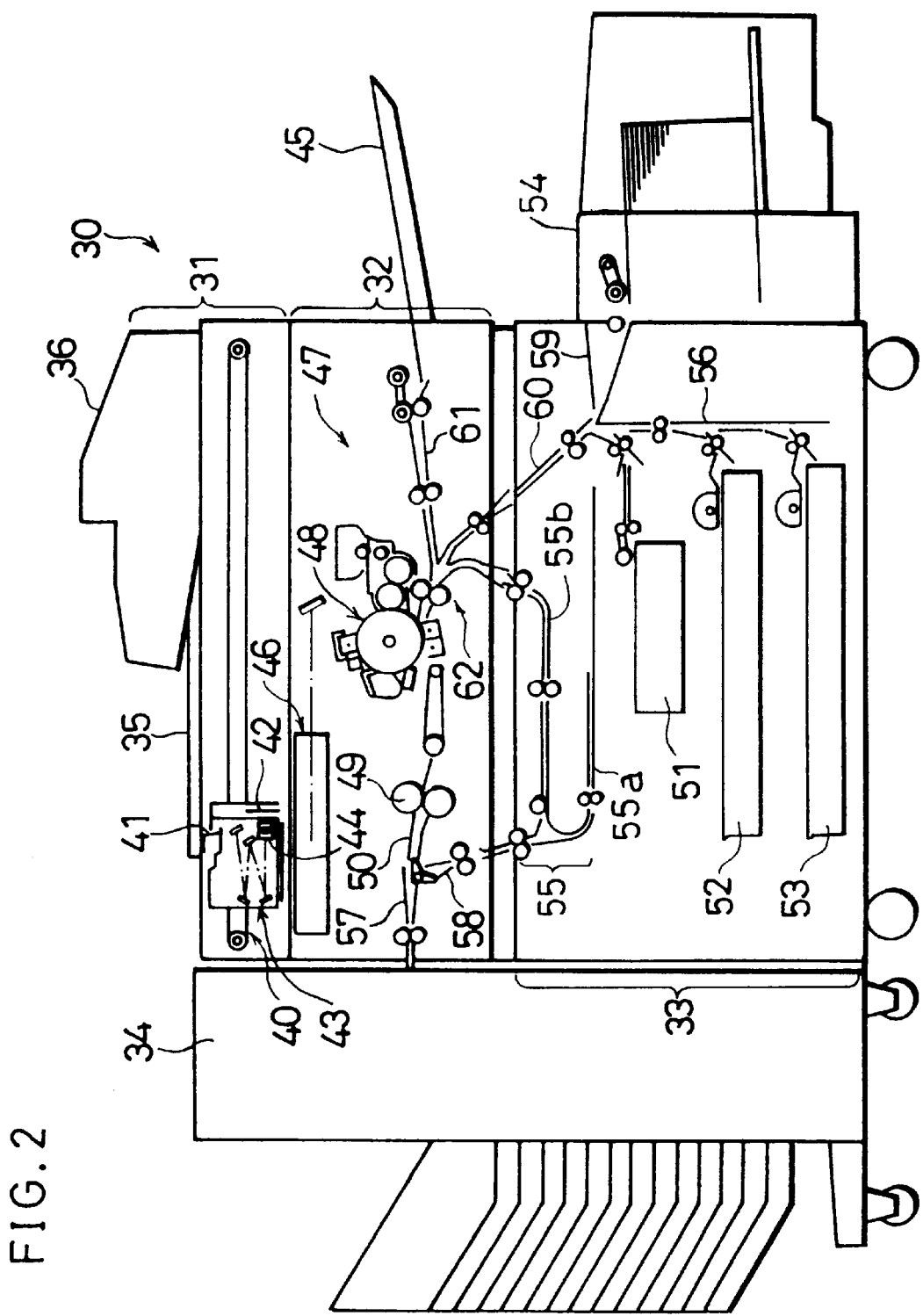
FIG. 2 is a longitudinal sectional view of a digital copying machine that is provided in the image-forming system.

FIG. 2 is a cross-sectional view showing the entire structure of a digital copying machine 30 which is one example of the above-mentioned digital copying machine. In FIG. 2, the digital copying machine 30 is constituted by a scanner section 31, a laser printer section 32 that functions as an image-recording section, a multi-stage paper-feed unit 33 and a post-processing device 34 including a sorter.

The scanner section 31 is provided with a document platen 35 made of transparent glass, a recirculating automatic document feeder 36 (hereinafter, referred to as RADF) and a scanner unit 40. The RADF 36 automatically supplies and feeds documents onto the document platen 35. The scanner unit 40 functions as a document-image reading unit for scanning and reading an image of a document that has placed on the document platen 35. The document image that has been read by the scanner section 31 is sent as image information, that is, as image data, to an image-processing section, which will be described later. The image-processing section carries out predetermined image processing on the image data.

The multi-stage paper-feed unit 33 has the first cassette 51, the second cassette 52, the third cassette 53 and the fourth cassette 54. The fourth cassette 54 is selectively added by the user.

Stacks of paper are housed in the respective stages of the cassettes 51 through 54 in the multi-stage paper-feed unit 33. When the user selects a cassette that contains paper of a desired size, sheets of paper are fed one by one from the stack of paper in the cassette, and successively transported toward the laser printer section 32.

The RADF 36 is a device that automatically feeds documents that have been set on a predetermined document tray one by one onto the document platen 35 of the scanner section 31. Here, a plurality of documents are set on the document tray all together. The RADF 36 is provided with a transport path for one-sided documents, transport paths for double-sided documents, a transport-path switching mechanism and other mechanisms. Thus, the scanner 40 is allowed to scan one side or double sides of a document in accordance with selection made by the user.

The scanner unit 40 is provided with a lamp reflector assembly 41, a CCD (Charge Coupled Device) 42, a plurality of reflection mirrors 43 and a lens 44.

The lamp reflector assembly 41 irradiates with light the surface of a document placed on the document platen 35 so as to scan it. The CCD 42 is an element that converts an image of reflected light from the document into an electric image signal. The reflection mirrors 43 direct the image of reflected light from the document to the CCD 42, and the lens 44 converges the image of reflected light from the document onto the CCD 42 as an image thereon. While successively placing documents onto the document platen 35, the scanner section 31 allows the scanner unit 40 to move along the lower surface of the document platen 35 through cooperative operations between the RADF 36 and the scanner unit 40. Thus, the scanner unit 40 scans the document image so as to convert it into image data.

The image data, thus obtained from the scanner section 31, is sent to an image-processing section which will be described later, and after it has been subject to various processes, the resulting data is temporarily stored in a memory 73 (see FIG. 3) of the image-processing section. Thereafter, the image data is supplied to the laser printer section 32 in accordance with an instruction for output, and recorded onto a sheet of paper as an image.

The laser printer section 32 is provided with a manual paper tray 45, a laser-writing unit 46, and an electrophotographic process section 47 for forming images. The laser-writing unit 46 has a semiconductor laser for releasing a laser light beam in response to the image data from the memory 73, a polygon mirror for deflecting the laser light beam with a constant angular velocity, an f-θ lens for correcting the laser light beam that has been subjected to the deflection with a constant angular velocity so that it is subjected to a constant-velocity deflection on the photoconductor drum 48 in the electrophotographic process section 47, and other parts.

In the same manner as conventional arrangements, the electrophotographic process section 47 is provided with the photoconductor drum 48, and devices, such as a charger, a developing device, a transfer device, a separating device, a cleaning device, a static eliminating device and a fixing device 49, all of which are disposed around the photoconductor drum 48. A transport path 50 is placed on the downstream side of the fixing device 49 in a transporting direction of a sheet of paper on which an image has been formed.

The transport path 50 is separated into a transport path 57 that connects to the post-processing device 34 and a transport path 58 that connects to the multi-stage paper-feed unit 33.

The multi-stage paper-feed unit 33 is provided with a double-side unit 55 and a common transport path 56. The double-side unit 55 has a reversing transport path 55a and a double-side/composite transport path 55b whose paper-feeding opening is connected to the paper-feeding and -sending opening of the reversing transport path 55a. The reversing transport path 55a is used for reversing the face and the bottom of a sheet of paper. The double-side/composite transport path 55b is used for directing sheets of paper that are transported through the transport path 58 into the electrophotographic process section 47.

The common transport path 56 is used for transporting sheets of paper that have been sent from any of the first cassette 51, the second cassette 52 and the third cassette 53 to the electrophotographic process section 47. The common transport path 56 is combined with the transport path 59 that comes from the fourth cassette 54 on the way to the electrophotographic process section 47, and connected to the transport path 60. The transport path 60, which joins the double-side/composite transport path 55b and a transport path 61 connecting to the manual paper tray 45 at their joining point 62, is directed to an image-forming position that is located between the photoconductor drum 48 and transfer device of the electrophotographic process section 47. The joining point 62 of these three transport paths are placed at a position close to the electrophotographic process section 47.

In the laser printer section 32, the image data, which has been read from the memory 73, is released as a laser light beam from the laser writing unit 46, and formed as an electrostatic latent image on the surface of the photoconductor drum 48 in the electrophotographic process section 47. The electrostatic latent image is visualized as a toner image. The toner image is electrostatically transferred onto a sheet of paper that has been transported from the multi-stage paper-feed unit 33, and then is fixed on the sheet of paper by the fixing device 49.

The sheet of paper on which the image has been formed in this manner is sent from the fixing device 49 to the post-processing device 34 through the transport paths 50 and 57, or again to the electrophotographic process section 47 through the transport paths 50 and 58 and the double-side unit 55.

Figure 3:
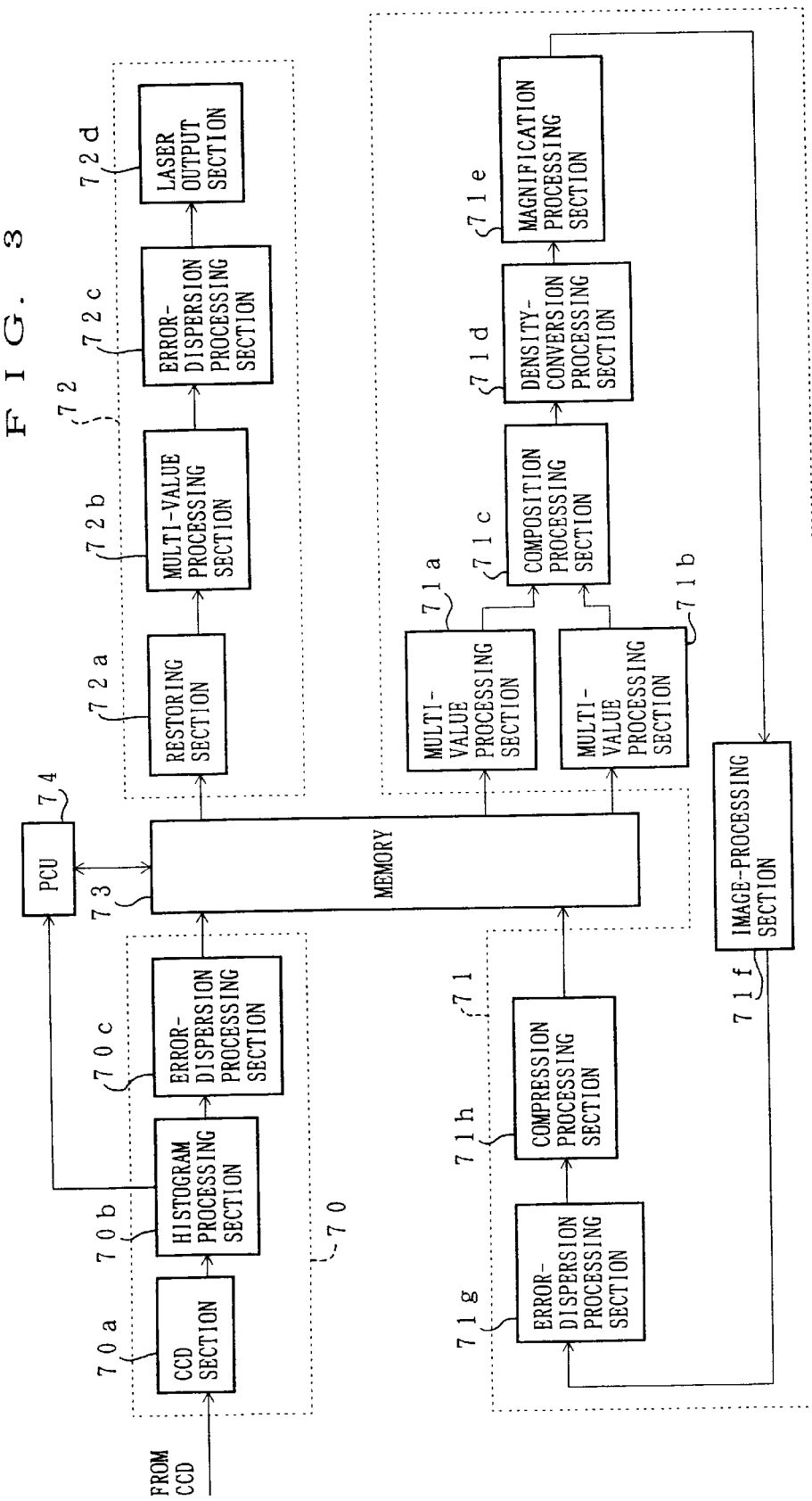
FIG. 3 is a block diagram that shows an arrangement of an image-processing section that is installed in the digital copying machine.

The following description will discuss the image-processing section that is installed in the digital copying machine 30. The image-processing section carries out image processing on the image data of the document that has been obtained from the scanner section 31. As illustrated in FIG. 3, the image-processing section is provided with an image-data input section 70, an image-data processing section 71 that functions as a processing section, an image-data output section 72, a memory 73 and a print control unit 74 (hereinafter, referred to as PCU) that functions as a transfer control section.

The PCU 74, which controls the entire operations of the digital copying machine 30, is constituted by a CPU (Central Processing Unit). The memory 73, which stores image data, is constituted by a RAM (Random Access Memory), a hard disk and other parts.

The image-data input section 70 has a CCD section 70a, a histogram processing section 70b and an error-dispersion processing section 70c. The image-data input section 70 converts image data of a document that has been read by the CCD 42 into binary coded data. Then, the image data is processed by using the error-dispersion method while representing the data as binary digital quantity in the histogram, thereby temporarily storing the resulting data in the memory 73.

In the CCD section 70a, analog signals, which correspond to pixel densities of the image data, are analog-to-digital converted, and then subjected to an MTF correction and a black-and-white correction, or a gamma correction, and the resulting signals are released to the histogram processing section 70b as digital signals with 256 gray scales (8 bit).

In the histogram processing section 70b, the digital signals released from the CCD section 70a are added individually for the respective pixel densities of 256 gray scales; thus, density information (histogram data) is obtained. The histogram data is sent to the error-dispersion processing section 70c as pixel data, or sent to the PCU 74, if necessary.

In the error-dispersion processing section 70c, the digital signals of 8 bits/pixel, released from the CCD section 70a, are converted into one bit (binary coded), and re-distributing operations are carried so as to exactly reproduce the densities of local regions of a document. These processes are carried out by the error-dispersion method which is one type of pseudo intermediate processing. The error-dispersion method is a method wherein errors which occur during the binary coding process are allowed to reflect the binary coding decision between the adjacent pixels.

The image-data processing section 71 is provided with a multi-value processing sections 71a and 71b, a composite processing section 71c, a density-conversion processing section 71d, a magnification processing section 71e, an image-processing section 71f, an error-dispersion processing section 71g and a compression processing section 71h. The image-data processing section 71 serves as a processing section for converting the inputted image data into image date that is desired by the user. Various processes are carried out in this section until final output image data has been stored in the memory 73. Additionally, the above-mentioned processing sections, contained in the image-data processing section 71, are used on demand, and are not necessarily used.

In the multi-value processing sections 71a and 71b, the image data that has been binary coded in the error-dispersion processing section 70c is again converted into data with 256 gray scales. In the composite processing section 71c, logical operations, that is, OR, AND or exclusive-OR operation, are selectively carried out for each pixel. The data used in this operation is pixel data stored in the memory 73 and bit data from a pattern generator (PG).

In the density-conversion processing section 71d, the relationship of the output density to the input density is properly set with respect to the data with 256 gray scales based upon a predetermined gray-scale conversion table. In the magnification processing section 71e, pixel data (density value) on a target pixel that is to be obtained after a specified change in magnification is found by carrying out an interpolating process based on the inputted known data in accordance with a specified magnification. Thereafter, in accordance with the pixel data, the change in magnification is carried out in the sub-scanning direction, and then is carried out in the main-scanning direction.

In the image-processing section 71f, various image processes are carried out on the inputted pixel data. Further, information extraction with respect to data rows, such as feature extraction, is carried out. In the error-dispersion processing section 71g, the same process as that carried out in the error-dispersion processing section 70c in the image-data input section 70 is carried out. In the compression processing section 71h, the binary data is compressed by a coding process that is referred to as "run length". Here, with respect to the compression of image data, the compression is operated in the last processing loop at the time when the final output image data has been complete.

The image-data output section 72 is provided with a restoring section 72a, a multi-value processing section 72b, an error-dispersion processing section 72c and a laser output section 72d. The image-data output section 72 restores the image data that has been stored in the memory 73 in a compressed state so as to again convert it to the original data with 256 gray scales, carries out an error dispersion process for quaternary data that provides smoother intermediate gray-scale expressions than binary data, and then transmits the resulting data to the laser output section 72d.

In the restoring section 72a, the image data that has been compressed by the compression processing section 71h is restored. The multi-value processing section 72b carries out the same process as that carried out in the multi-value processing sections 71a and 71b in the image-data processing section 71. The error-dispersion processing section 72c carries out the same process as that carried out in the error-dispersion processing section 70c in the image-data input section 70.

In the laser output section 72d, the digital pixel data is converted to a laser on/off signal in accordance with a control signal from a sequence controller which is not shown. The semiconductor laser in the laser-writing unit 46 is turned ON/OFF in response to the on/off signal, thereby allowing an electrostatic latent image to be written on the photoconductor drum 48.

Additionally, data, which is dealt in the image-data input section 70 and the image-data output section 72, is basically stored in the memory 73 in the form of binary data so as to save the capacity of the memory 73; however, the data may be processed in the form of quarterary data in order to prevent the degradation of image data.

Figure 4:
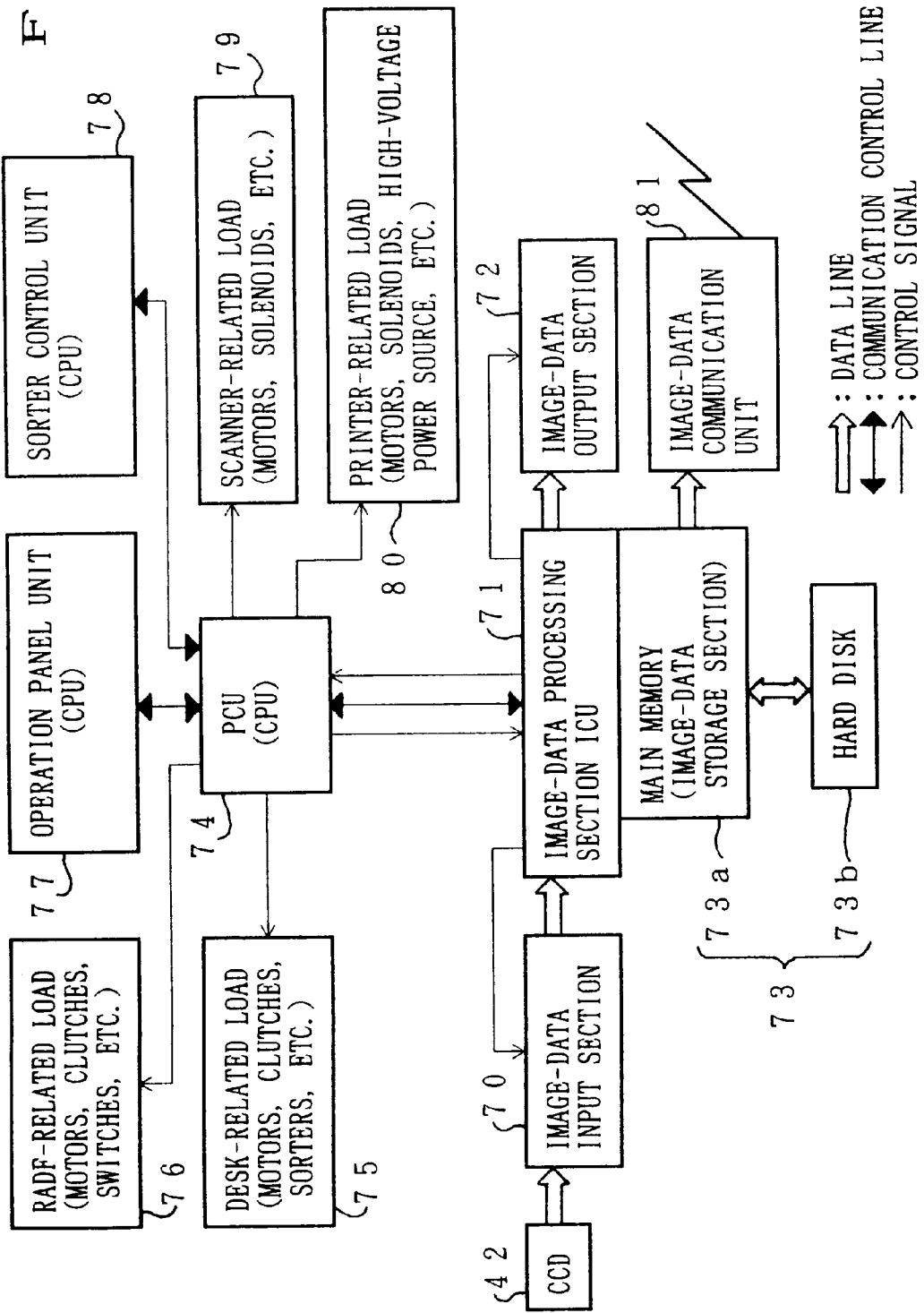
FIG. 4 is a block diagram that shows an arrangement of a control system that is installed in the digital copying machine.

The operation of the digital copying machine 30 is controlled by the PCU 74, and FIG. 4 shows the arrangement of the control system effected by the PCU 74.

In FIG. 4, the following parts and sections are connected to the PCU 74: a desk-related load 75, an RADF-related load 76, an operation panel unit 77, a sorter control unit 78, a scanner-related load 79, a printer-related load 80 and the aforementioned image-data processing section 71.

The PCU 74 supervises the above-mentioned parts by sequential control, and releases control signals to the respective parts upon controlling them. The desk-related load 75 is a load related to motors, clutches and other parts in the multi-stage paper-feed unit 33 and the sorter of the post-processing device 34 except for the digital copying machine main body. The RADF-related load 76 is a load related to motors, clutches, switches and other parts in the RADF 36. The scanner-related load 79 is a load related to motors, solenoids and other parts in the scanner unit 40. The printer-related load 80 is a load related to motors, solenoids, a high-voltage power source and other parts in the electro-photographic process section 47. The sorter control unit 78, which is provided with a CPU, controls the operation of the sorter in accordance with the control signal from the PCU 74.

The operation panel unit 77, which has a CPU, is an input section for various settings such as copying modes, instructions, etc. that are inputted by the user to the digital copying machine 30. The operation panel unit 77 transfers a control signal, for example, corresponding to a copying mode that has been set by the user through an input operation, to the PCU 74. The PCU 74 operates the digital copying machine 30 in accordance with the corresponding mode in response to the control signal. The PCU 74 also transfers to the operation panel unit 77 a control signal that indicates the operation state of the digital copying machine 30. In order to inform the user of the current operation state of the digital copying machine 30, the operation panel unit 77 displays the current state on its display section in accordance with the control signal.

Moreover, the memory 73, connected to the image-data processing section 71, is constituted by a main memory 73a and a hard disk 73b which are made of, for example, semiconductor memories. An image-data communication unit 81 is connected to the main memory 73a. The image-data communication unit 81 is installed so as to make possible information communications between the digital copying machine 30 and the other digital information apparatuses through image data, image-control signals, etc. For example, in a digital copying machine 93 shown in FIG. 11, the image-data communication unit 81 corresponds to an interface 93a, or corresponds to the interface 93a and a modem 98a and 98b.

The operation panel unit 77 is provided with an operation panel 90 which functions as an input section, as shown in FIG. 5. On the operation panel 90, a liquid crystal display 1, which is a display section of a touch panel system, is placed in the center thereof. A screen-switching instruction area 1a is disposed on one part of the screen of the liquid crystal display 1. The screen-switching instruction area 1a is used for inputting an instruction for switching the display screen of the liquid crystal display 1 to a screen for selecting image-editing functions. When the user directly presses this area 1a with his or her finger, various editing functions are displayed in a list on the screen of the liquid crystal display 1 so as to make it possible to select desired functions, as will be described later. In this case, when the user presses an area of a desired editing function among display areas of the various editing functions, the specified editing function is set.

Further, on the operation panel 90, a brightness adjusting dial 2, which adjusts the brightness of the screen of the liquid crystal display 1, is placed on its left-end position as shown in FIG. 5. A magnification automatic setting key 3, a zoom key 4, fixed magnification keys 5 and 6, and an equal magnification key 7 are provided between the dial 2 and the liquid crystal display 1. The magnification automatic setting key 3 is used for setting the mode for automatically selecting the copy magnification, and the zoom key 4 is used for setting the copy magnification at a rate of 1 percentage point. The fixed magnification keys 5 and 6 are used for selecting a fixed magnification, and the equal magnification key 7 is used for returning the copy magnification to the reference magnification (equal magnification).

On the right-hand position of the liquid crystal display 1 in FIG. 5, a number setting key 13, a clear key 14, a start key 15, an all cancellation key 16, an interruption key 17, an operation guide key 18, a message forwarding key 19, a memory-transmission mode key 20, a copy/facsimile mode switching key 21, and one-touch dial key 22 are disposed.

The number setting key 13 is used for setting the number of copies, and the clear key 14 is operated when the number of sheets is cleared, or when a continuous copying operation is stopped in the middle of the operation. The start key 15 is used for instructing the start of a copy process, and the all cancellation key 16 is used for cancelling all the presently set modes so as to return the machine to the reference state. The interruption key 17 is operated when upon a continuous copying process, another document is to be copied. The operation guide key 18 is operated when the user does not know how to use the digital copying machine 30, and upon pressing the key, the liquid crystal display 1 displays how to operate the digital copying machine 30. The message forwarding key 19 is used for switching the display of messages that have been displayed by the operation of the operation guide key 18 in a successive forwarding manner.

The memory-transmission mode key 20, the copy/facsimile mode switching key 21, and the one-touch dial key 22 are setting keys related to facsimile modes. The memory-transmission mode key 20 is used for instructing that the transmit document be transmitted after having been temporarily stored in the memory, and the copy/facsimile mode switching key 21 is used for switching modes of the digital copying machine 30 between the copy and facsimile. The one-tough dial key 22 is used for dialing the phone to a receiver whose telephone number has been preliminarily stored in the digital copying machine 30 by a one-touch operation.

Here, the above-mentioned arrangement of the operation panel 90 related to various kinds, layout, etc. of keys is merely given as one example, and it may be modified depending on various functions to be installed in the digital copying machine 30.

The liquid crystal display 1, for example, gives the following displays on the screen: a basic screen, the first-function setting screen, the second-function setting screen, an image-quality setting screen, a post-process setting screen, an initial setting screen, a finger-print registering screen, a department-management setting screen, a limiter setting screen, a simulation screen, a maintenance-management setting screen, and other screens which will be described later.

As shown in FIG. 6(a), the basic screen is provided with key displays for setting various editing functions. These keys include a function setting key 101a, an image-quality setting key 101b, a post-process setting key 101c, an initial setting key 101d, a setting-function confirmation key 101e and a cassette-setting key 101f. Moreover, the basic screen includes a set-cassette display, a density display, a copy-number display and a magnification display. For example, when the setting-function confirmation key 101e is pressed, various functions which have been set in the present image-forming system are displayed on the screen of the liquid crystal display 1.

As shown in FIG. 6(b), the first-function setting screen is provided with key displays for setting various editing functions. These keys include a mirror-image setting key 102a, a slanted-character setting key 102b, an inversion-setting key 102c, a shading-setting key 102d, a trimming-setting key 102e, a masking-setting key 102f, a basic-screen key 102g for making a switch to the basic screen, and a next-screen key 102h for making a switch to the next screen.

As shown in FIG. 6(c), the second-function setting screen is provided with key displays for setting editing functions. These keys include a composition-setting key 103a, an independent-magnification setting key 103b, a rotation-setting key 103c, a translation-setting key 103d for translating from English to Japanese, an enlargement-setting key 103e, a reduction-setting key 103f, a basic-screen key 103g for making a switch to a basic screen, and a previous-screen key 103h for making a switch to the previous screen. For example, the independent-magnification setting key 103b is pressed, the magnifications of a document image in the longitudinal and lateral directions are independently set.

As shown in FIG. 7(a), the image-quality setting screen is provided with various key displays. These keys include a density-setting key 104a, a HI-FI (high-image-quality copying mode) setting key 104b, a background-elimination mode setting key 104c, an automatic-magnification-changing mode setting key 104d, a character-mode setting key 104e, a character-photograph mixed-mode setting key 104f, a photograph-mode setting key 104g and a magnification-setting key 104h. Further, the image-quality setting screen is provided with displays for density and magnification.

As shown in FIG. 7(b), the post-process setting screen is provided with a document-input key 105a for determining whether a document in question is one-sided or double-sided, a copy-input key 105b for determining whether copying in question is made on one side or on double sides, and a binding-function setting key 105c. Moreover, the post-process setting screen is provided with various key displays for setting post-process functions. These keys include a staple-sorter setting key 105d, a sorter-setting key 105e, a finish-setting key 105f, and an electronic RDH (Recycle Document Handler) setting key 105g.

When the electronic RDH setting key 105g is pressed, all image data corresponding to, for example, documents of 10 pages is temporarily stored in the memory 73. Thus, image data corresponding to respective pages is successively called for from the memory 73, and copying operations are carried out page by page. In this case, the copying operations are repeatedly carried out predetermined times until necessary copies are obtained.

As shown in FIG. 8(a), the initial setting screen is provided with key displays for setting various modes. These keys include a finger-print registration setting key 106a, a department-management setting key 106b, a simulation-setting key 106c, a maintenance-management setting key 106d, a new-function registration setting key 106e, and a selection-setting key 106f for making a selection from output devices, and a basic-screen key 106g for making a switch to a basic screen.

When the finger-print registration setting key 106a is pressed, a finger-print registering screen is provided on the liquid crystal display 1, as shown in FIG. 8(b). On the finger-print registering screen, an input region 107a for accepting a department code and a name, display regions 107b and 107c for displaying the inputted department code and the name are displayed. The setting is complete when, upon entry of the department code and the name, a setting completion key 107d has been pressed.

When the department-management setting key 106b is pressed on the initial setting screen, a department-management setting screen is provided on the liquid crystal display 1, as shown in FIG. 8(c). On the department-management setting screen, if a limiter-setting key is pressed, a limiter-setting screen is displayed as shown in FIG. 9(a). Further, when the simulation-setting key 106c is pressed on the initial setting screen, a simulation-setting screen is provided on the liquid crystal display 1, as shown in FIG. 9(b).

Transitions to the respective screens are carried out in accordance with the sequence shown in FIG. 10. In other words, in the liquid crystal display 1, the basic screen is first displayed. On this display screen, when any of the function-setting key 101a, the image-quality setting key 101b, the post-process setting key 101c and the initial setting key 101d is pressed, the display screen is switched to another screen corresponding to the specified key. For example, if the function-setting key 101a is pressed, the screen is switched to the first-function setting screen. On this screen, if the next-screen key 102h is pressed, the screen is switched to the second-function setting screen (NEXT-function setting screen). Here, if the basic-screen key 102g is pressed, the screen is switched to the basic screen.

Moreover, for example, in the first-function setting screen, if the next-screen key 102h is pressed so that the second-function setting screen is provided, and if, on this screen, the rotation-setting key 103c is pressed, the screen is switched to the rotation-setting screen as shown in FIG. 15(a). This screen is, for example, a parameter setting screen of function 12 in FIG. 10. On the rotation-setting screen, an angle-input key 116a, which is a setting region for rotation angle, and a setting completion key 116b, which is an input region for completion of the setting, are provided. Furthermore, the rotation angle is displayed.

In other words, when desired function-setting keys are pressed on the first and second function-setting screens, the corresponding parameter setting screen, for example, the rotation-setting screen, is provided on the liquid crystal display 1.

Here, Table 1 shows examples of image-editing functions that are provided in the present image-forming system and that can be set by the operations of the above-mentioned function setting keys. However, the image-editing functions that are set in the present image-forming system are not intended to be limited thereby. For example, other functions, such as a function for making a fair copy of hand-written characters and images, may be provided.

TABLE 1

| Image-editing functions | Outline of processing |
| --- | --- |
| Independent change in magnification | Sets different magnifications with respect to the longitudinal and lateral directions of a document image. |
| sharpness | Adjusts the image quality of a copy. |
| Margin for binding | Makes a margin in a copy with a desired width. |
| Erasure of frame | Makes a copy with its frame erased. |
| Centering | Makes a copy virtually in the center of a sheet of copy paper. |
| 2 copies in one set | Copies a book. |
| Address copy | Outputs a copy image with an address synthesized therein. |
| Multi-shot | Combines and copies images of a plurality of pages to one sheet and copied. |
| Trimming | Copies only a specified portion. |
| Masking | Makes a copy with a specified portion erased. |
| Shifting function | Makes a copy with a document image shifted to a desired position. |
| Composite function | Composes and copies a plurality of document images. |
| Black-white inversion | Makes a copy with a negative/positive inversion. |
| Net process | Makes a copy with a net providing/erasing process. |
| Shading | Makes a copy with shades. |
| Framing | Makes a copy with its image framed. |
| Slanted image | Makes a copy with its image slanted. |
| Mirror image | Makes a copy with its image inverted like a mirror image. |
| Repeat copy | Copies a plurality of the same images on one sheet. |
| 2 in 1 copy | Copies a set of two documents on one sheet. |
| Dated copy | Makes a copy with the date written therein. |
| Center mark | Copies an image with a center mark added thereto. |
| Enlarged divisional output | Copies an enlarged document onto a plurality of sheets in a divided manner. |
| Translation | Translates a document. |
| High-image-quality process | Makes a copy using a high-image quality process. |

For example, as shown in FIG. 11, the present image-forming system is provided with digital copying machines 91 through 93 that are image-forming apparatuses installed in an office, a scanner 94 and a printer 95 that functions as an image-forming apparatus, as well as a large-size host computer 96 that is an image-processing apparatus installed in a service center located outside the office. The service center is a place where various information services including high-level image processes can be carried out. The host computer 96 has a function as a processing section wherein predetermined image processing is carried out on inputted image information.

The digital copying machine 91 is a low-function, inexpensive, memory-less one, and merely has basic editing functions. Here, "memory-less" means that although a page memory, which is capable of storing a lot of image data, is not provided, at least a line memory required for carrying out normal jobs for image data in a digital copying machine is provided. Further, basic editing functions are those functions, such as black-white inversion, slanted character and mirror image, that can be carried out without a page memory. Moreover, in the digital copying machine 91, the scanner function, provided by the scanner unit 40 in FIG. 2, has a resolution of 400 DPI in the case of a monochrome process. Here, the copy speed is set to 20 CPM (20 sheets/minute); thus, the digital copying machine 91 is regarded as a low-speed apparatus. Furthermore, in the digital copying machine 91, the printer function, provided by the laser printer section 32, is set to 400 DPI in the case of a monochrome process, and an interface (I/F) 91a is also installed.

The digital copying machine 92 has a scanner function of a resolution of 400 DPI in the case of a monochrome process, a printer function of 400 DPI in the case of a monochrome process, and a copy speed of 40 CPM; thus, the digital copying machine 92 is regarded as a middle-class apparatus. Further, there are installed various editing functions, a page memory, and an interface 92a. In addition to the above-mentioned basic editing functions, the various editing functions include a variety of editing functions such as a composite function and a repeating function. The above-mentioned page memory has a capacity of 64 M bytes (a capacity corresponding to 4 pages in A4-size with 400 DPI, 8 bits/pixel), and corresponds to the main memory 73a shown in FIG. 4.

The digital copying machine 93 has a scanner function of a resolution of 400 DPI in the case of a monochrome process, a printer function of 400 DPI in the case of a monochrome process, and a high copy speed of 60 CPM. Further, there are installed various editing functions, a character-recognizing function, a coding function for bit data and a page memory; thus, the digital copying machine 93 is regarded as a high-class apparatus. The page memory has a large capacity of 500 M bytes (a capacity corresponding to 100 pages in A4-size with 400 DPI, 8 bits/pixel at a compression rate of 1/4). The capacity of the page memory is equivalent to the combined capacity of the main memory 73a and the hard disk 73b shown in FIG. 4. Therefore, the digital copying machine 93 makes it possible to carry out a process for changing the order of pages of image data and also to store document data in various formats, in addition to the editing functions of the digital copying machine 92.

Further, the digital copying machine 93 is provided with an interface 93a. Moreover, the digital copying machines 91 through 93 are connected by, for example, Ethernet that is a network capable of transferring image data at high speeds. Furthermore, the interface 93a is compatible with commonly-used standards such as SCSI (Small Computer System Interface) and RS-232C, so as to make it possible to carry out data communications with other information apparatuses.

Here, the scanner 94, which can read color images, has a resolution of 600 DPI. The printer 95, which can print color images, has a recording density of 600 DPI. These scanner 94 and printer 95 are connected to the digital copying machine 93 through the respective interfaces 94a and 95a, and allowed to transmit and receive image data to and from the digital copying machine 93.

The host computer 96 is provided with: a CPU for processing data at high speeds, algorithms for editing data at high speeds, algorithms for recognizing information at high speeds, a large-capacity memory whose capacity is far greater than the memory 73 of the digital copying machine 93, various data bases for recognizing paper money, etc., and an interface 96a.

The digital copying machine 93 and the host computer 96 are connected to each other, for example, by a telephone line 97 through the respective interfaces 93a and 96a. Here, the connection between the apparatuses is not intended to be limited to the telephone line 97; any suitable communication line, such as an optical communication network, can be used for connecting them. Commonly-used modems 98a and 98b (modulation devices), such as those applicable to, for example, ISDN (Integrated Services Digital Network), are installed on the digital copying machine 93 side and the host computer 96 side. The modems 98a and 98b are devices for converting digitized electric signals into signals that are suitable for transmitting and receiving by the use of the telephone line 97. The modulation methods in the modems 98a and 98b include PM (Phase Modulation), AM (Amplitude Modulation), FM (Frequency Modulation) and other methods. The interfaces 91a through 96a, the telephone line 97 and the modems 98a and 98b constitute a transfer device.

It is possible to transmit and receive various types of data between the digital copying machines 91 through 93 and the host computer 96 through the telephone line 97. The contents of the data are, for example, control-use command codes and bit data such as density data of images. Moreover, each of the digital copying machines 91 through 93 has a FAX function for transmitting and receiving data through the telephone line 97 and a printer mode for printing document data released from a personal computer, a word processor and other devices.

Additionally, FIG. 11 shows a case wherein one office is connected to a service center; however, in an actual case, offices of a number of users that are located throughout the country may be connected the service center. Moreover, in general, digital copying machines that are installed in the respective offices have a lot of variations in their functions depending on their prices, capacities of image memory and other aspects. Further, various types of them are used depending on purposes for use in respective offices and degrees of demand for various functions. Therefore, with respect to the digital copying machines installed in the offices, a number of like commodities may be used without being limited to the digital copying machines 91 through 93.

Moreover, the host computer 96 is intended to provide high image-processing functions including image-editing functions and high-speed image processing. Therefore, the host computer 96 is at least provided with functions that are commonly installed in a digital copying machine. However, those basic functions that are installed even in inexpensive models may be omitted. In other words, predetermined functions are installed in the host computer 96 by taking into account suitable functions that are to be supplied by the service center.

Furthermore, with respect to the image-processing functions, new functions are successively developed in order to meet demands for improvements of infrastructure and improvements for business efficiencies in the information-dependent society. Therefore, with respect to the image-processing functions installed in the host computer 96, new functions are added thereto or introduced in place of those conventionally used and relatively reduced in their utility value. Here, the following table 2 shows one example of image-editing functions that are provided in the digital copying machines 91 through 93 and the host computer 96.

TABLE 2

| Image-editing functions | Copying Machines | | | Host |
| --- | --- | --- | --- | --- |
| | 91 | 92 | 93 | Comp |
| Independent changes in magnifications | ✓ | ✓ | ✓ | ✓ |
| Sharpness | | ✓ | ✓ | ✓ |
| Margin for binding | ✓ | ✓ | ✓ | ✓ |
| Erasure of frame | ✓ | ✓ | ✓ | ✓ |
| Centering | | ✓ | ✓ | ✓ |
| 2 copies in one set | | ✓ | ✓ | ✓ |
| Address copy | | | ✓ | ✓ |
| Multi-shot | | ✓ | ✓ | ✓ |
| Trimming, Masking | | ✓ | ✓ | ✓ |
| Shifting function | | ✓ | ✓ | ✓ |
| Composite function | | | ✓ | ✓ |
| Black-White inversion, Net process | ✓ | ✓ | ✓ | ✓ |
| Shading, Framing | | | ✓ | ✓ |
| Slanted image, Mirror image | | | ✓ | ✓ |
| Repeat copy | ✓ | ✓ | ✓ | ✓ |
| 2 in 1 copy | | | ✓ | ✓ |
| Dated copy, Center mark | | | ✓ | ✓ |
| Enlarged divisional output | | | | ✓ |
| Translation | | | | ✓ |
| High-image-quality process | | | | ✓ |

As shown in Table 2, the digital copying machines 93, 92 and 91 have image-editing functions whose levels become higher in this order, and the host computer 96 has the highest image-processing functions. Therefore, even in the case when an image-editing function which is not provided in the digital copying machines 91 through 93 in the offices is required, or even in the case when a desired image-editing function is not available due to an insufficient capacity of the memory 73 on the digital copying machines 91 through 93, the present image-forming system functions very effectively.

Figure 12:
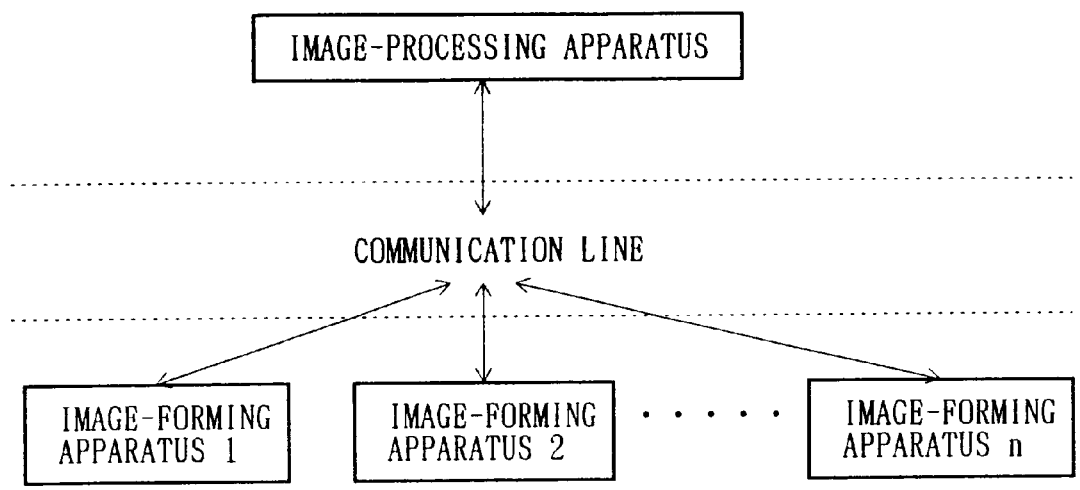
FIG. 12 is an explanatory drawing that shows a state in which information is mutually transferred between an apparatus on the outer side and apparatuses on the inner side through communication lines in the above-mentioned image-forming system.

In other words, as shown in FIG. 12, image data is first transferred from the office side to the service center side. After the transferred image data have been processed by the host computer 96 in the service center, the processed image data is returned to the office. Thus, even if a desired process is not available in the digital copying machine 91, 92 or 93, the desired process can be carried out by the host computer 96 and image information which has been subjected to the desired process can be outputted onto a sheet of paper on the office side.

Next, the following description will discuss the basic operations of the present image-forming system. As shown in FIG. 11, the digital copying machines 91 through 93 in the offices and the host computer 96 in the service center are capable of transmitting and receiving data between each other through the telephone line 97. Therefore, for example, a digital signal, transmitted from any of the digital copying machines 91 through 93, is modulated by the modem 98a in the digital copying machine 93, and transmitted to the host computer 96 through the telephone line 97. Then, the resulting signal is demodulated by the modem 98b in the host computer 96, and inputted to the host computer 96. The contents of the digital signal are control-use command codes and bit data such as density data of images.

The host computer 96 analyzes the contents of the control-use command codes, and carries out image processing in accordance with image-editing functions that have been specified on the image data. The image data that have been processed by the host computer 96 is returned to the digital copying machine 93 through the reverse sequence to that upon transmission, and outputted onto a sheet of paper as image data, for example, by the digital copying machine 93.

When the image data is transferred from the office to the service center, the smaller the amount of image data to be transferred, the more advantages the system has from the time and economic standpoints. Therefore, in the image-forming system of the present embodiment, if a plurality of image processes are selected, a decision is made as to which image process should be preferentially carried out so as to minimize the amount of image data to be transferred.

Figure 13:
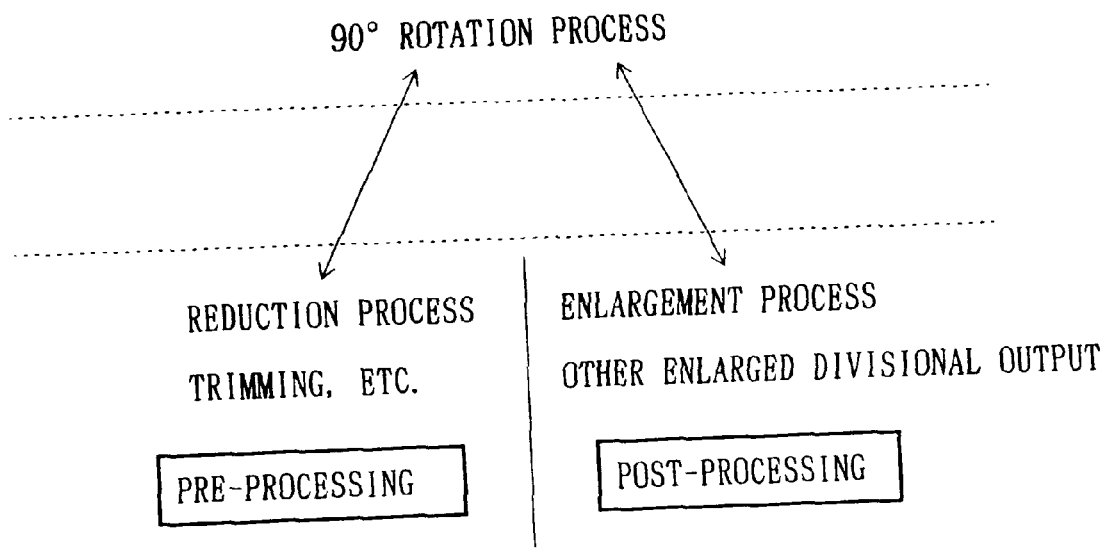
FIG. 13 is an explanatory drawing that shows the processing capability and the contents of pre-processing and post-processing of each apparatus on the outer side and the inner side in the above-mentioned image-forming system.

With respect to processes that reduce the amount of image data, "trimming" and "reduction" processes are, for example, given. Here, for example, if two image processes, "reduction" and "rotation" processes, are selected, the image processes are carried out as described below. As shown in FIG. 13, the "reduction" process is preferentially carried out on the office side (pre-processing). Then, the processed data is transferred to the service center, and the "rotation" process is carried out in the service center.

In contrast, with respect to processes that increase the amount of image data, "enlargement" and "enlarged divisional output" processes are, for example, given. Here, for example, if two image processes, "enlargement" and "rotation" processes, are selected, the image processes are carried out as described below. The image data is first transferred to the service center, and the "rotation" process is carried out on the service center side. Then, the processed data is transferred to the office, and the "enlargement" process is carried out in the office (post-processing).

Figure 1:
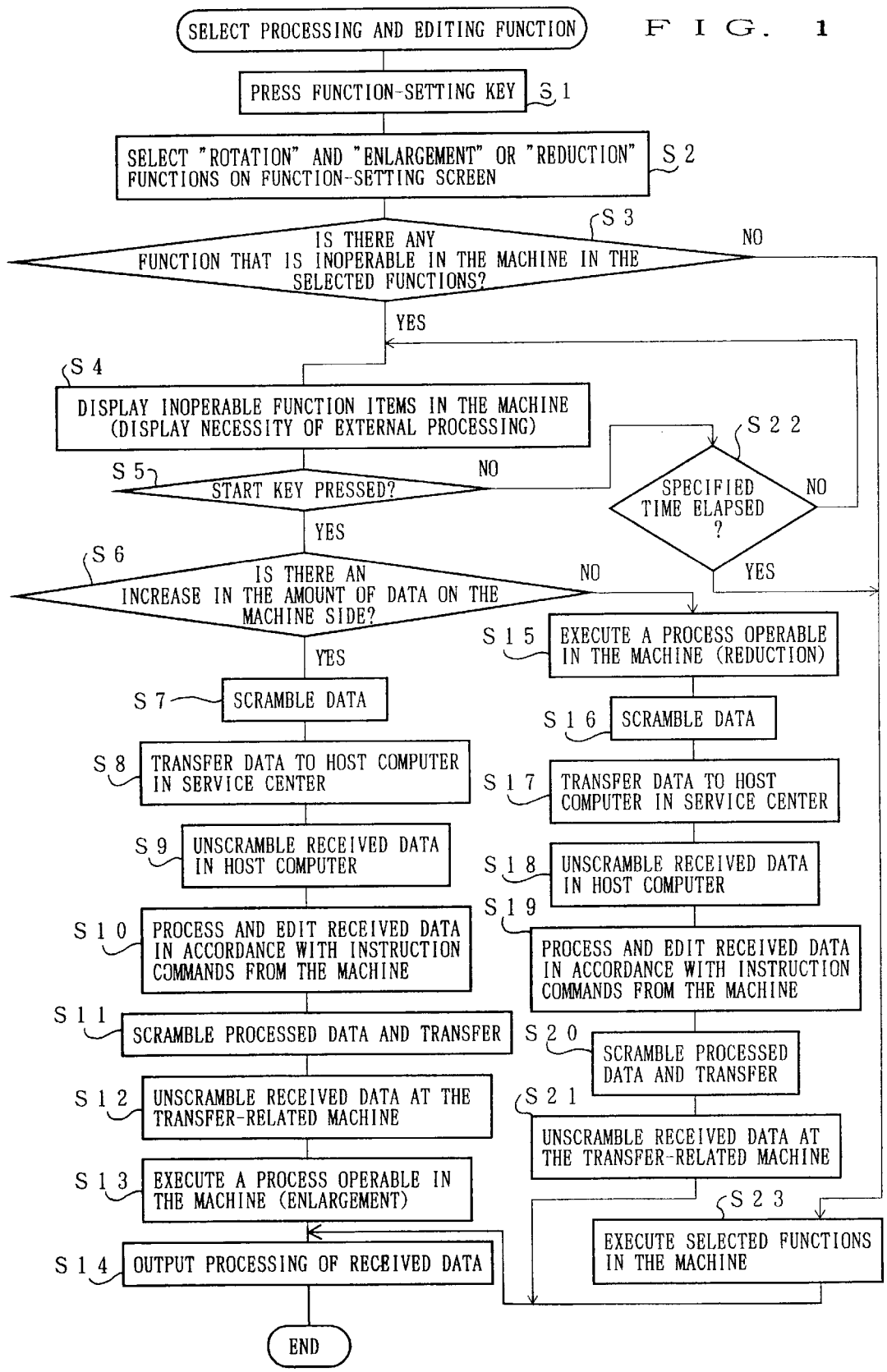
FIG. 1 is a flow chart that shows operations of an image-forming system in accordance with one embodiment of the present invention.

Next, referring to the flow chart of FIG. 1, an explanation will be given in detail of the operation for carrying out image processing by using the image-processing service in the service center in the present image-forming system. Here, it is supposed that "rotation" process and "enlargement" or "reduction" process are selected with respect to a document image in the digital copying machine 91. It is further supposed that the "rotation" process is carried out by the host computer 96 and that the "enlargement" or "reduction" process is carried out by the digital copying machine 91 that is the designated machine. Additionally, the function-setting screen of the liquid crystal display 1 is designed to display functions provided in the host computer 96 as well. Further, image data that is to be processed is data of a document image that has been read by the scanner section 31 of the digital copying machine 91.

When the function-setting key 101a is pressed (S1) on the basic screen of the liquid crystal display 1 shown in FIG. 6(a), the screen of the liquid crystal display 1 is switched to the first-function setting screen as shown in FIG. 6(b). Next, on this screen, when the next screen key 102h is pressed, the display screen is switched to the second-function setting screen, as shown in FIG. 6(c). Next, in this state, when the rotation-setting key 103c and the enlargement-setting key 103e are pressed (S2), the display regions of the rotation-setting key 103c and the enlargement-setting key 103e are displayed in an inverted state as shown in FIG. 14(a) on the screen of the liquid crystal display 1. These inverted displays indicate that the rotation-setting key 103c and the enlargement-setting key 103e have been pressed.

Next, the PCU 74 in the digital copying machine 91 makes a judgement as to whether or not the set functions include any function that is inoperable in the digital copying machine 91 (S3). In this case, as shown in Table 2, the digital copying machine 91 does not have a "rotation" function although it has a magnification-converting function which includes the "enlargement" or "reduction" process. Therefore, the result of judgement at S3 is "YES". Accordingly, as shown in FIG. 14(b), the information that "rotation" is inoperable in the digital copying machine 91 and the information that the host computer 96 should be used for processing "rotation" are displayed on the liquid crystal display 1 (S4).

Successively, when a start key 112a, placed on the above-mentioned display screen, is pressed (S5), the screen of the liquid crystal display 1 is switched to a rotation-setting screen shown in FIG. 15(a). Then, the angle of "rotation" is inputted through the angle input key 116a that is placed on the display screen, and when the setting completion key 116b is pressed, the screen of the liquid crystal display 1 is successively switched to a magnification-setting screen as shown in FIG. 15(b). The rate of copying magnification is inputted by a magnification-input key 117a that is placed on the display screen.

When a setting completion key 117b is pressed, the PCU 74 of the digital copying machine 91 makes a decision as to which process should be preferentially carried out with respect to the two image processes, that is, the "rotation" process and the "enlargement" or "reduction" process, so as to minimize the amount of image data to be transferred to the host computer 96.

In other words, after S5, the PCU 74 of the digital copying machine 91 makes a judgement as to whether or not the amount of image data increases if the process is carried out by its own machine (S6). Here, for example, if "enlargement" has been selected, the amount of image data increases. Therefore, the result of judgement at S6 is "YES". Accordingly, in order to carry out the "enlargement" process after the "rotation" process, the PCU 74 of the digital copying machine 91 scrambles the image data (S7), and then transfers the resulting image data to the host computer 96 in the service center (S8). In this case, a control-use command code, that is, a command code for instructing the "rotation" process, and image data that is to be subjected to the "rotation" process are inputted to the host computer 96 through the interface 91a, the line connecting the digital copying machine 91 and the digital copying machine 93, the interface 93a, the modem 98a, the telephone line 97, the modem 98b and the interface 96a.

Here, the scramble process is carried out so as to prevent the image data from leaking out. In other words, in the present image-forming system, communications between the office sides and the service-center side are carried out by using, for example, a general-use net work. In this case, a number of unidentified people can freely access the network, and there is a possibility that data flowing through the network might be illegally taken by a person such as a hacker. Therefore, in the present image-forming system, such leakage of image data is prevented by the data conversion that is carried out by the scrambling process.

The host computer 96, on the other hand, unscrambles the data sent from the digital copying machine 91 (S9). Then, the host computer 96 confirms the contents of process that are requested through a command code, and carries out a "rotation" process on the image data in accordance with the contents of the request (S10).

Upon completion of the processes on the image data, the host computer 96 scrambles the image data that has been subject to the process, and then returns the image data to the digital copying machine 91 that originally transmitted the image data, through a path that is reversed to the previous path (S11).

The digital copying machine 91 unscrambles the received data (S12). Then, the digital copying machine 91 carries out an "enlargement" process that is operable by the machine itself on the returned image (S13).

Finally, it outputs the image data onto a sheet of paper as an image (S14). This operation is carried out as explained with respect to the aforementioned digital copying machine 30.

In contrast, if the result of judgement at S6 is "NO", that is, if the PCU 74 of the digital copying machine 91 makes a judgement at S6 that the amount of image data decreases if a certain process is carried out by its own machine, as is the case in processes such as a "reduction" process, the PCU 74 of the digital copying machine 91 first carries out the "reduction" process that is operable in the digital copying machine 91 (S15).

Successively, the PCU 74 of the digital copying machine 91 scrambles the image data that has been subjected to the "reduction" process (S16). Then, the PCU 74 transfers the resulting image data to the host computer 96 in the service center (S17).

The host computer 96 unscrambles the image data that has been sent from the digital copying machine 91 (S18). Next, the host computer 96 carries out a "rotation" process on the image data in accordance with the contents of the request (S19).

Upon completion of the processes on the image data, the host computer 96 scrambles the image data that has been subject to the process, and then returns the image data to the digital copying machine 91 that originally transmitted the image data, through a path that is reversed to the previous path (S20).

The digital copying machine 91 unscrambles the transmitted data (S21), and the digital copying machine 91 outputs the image data on a sheet of paper as an image (S14).

Here, if a predetermined time has elapsed at S5 before the start key 112a is pressed (S22), the digital copying machine 91 carries out only the "enlargement" process, which is operable in the digital copying machine 91 (S23), and the sequence proceeds to S14. Here, the time counting operation of the predetermined time is carried out by a timer that is provided in the PCU 74.

Further, if functions, which have been selected at S3, are all operable by the digital copying machine 91, the machine carries out the "enlargement" and "rotation" processes in the same manner (S23), and the sequence proceeds to S14.

Moreover, in the above-mentioned example, the image data that has been subject to the process in the host computer 96 is returned to the digital copying machine 91 that originally transmitted the data (S11), and the digital copying machine 91 outputs an image (S14); however, instead of this arrangement, a digital copying machine or a printer may be selected in accordance with various conditions, and the image may be transferred to, and outputted by the selected digital copying machine or printer.

As described above, in the image-forming system of the present embodiment, image information is obtained by the scanner section 31 that is installed in the digital copying machine 91 so as to read a document image. In this case, if a plurality of image processes are selected with respect to the image information, the image-data processing section 71 in the digital copying machine 91 and the host computer 96 are used to carry out the respective image processes.

In other words, when the user presses the operation panel 90 to give an instruction so that desired image processes are carried out on the image information, the PCU 74 selects, for example, a digital copying machine 91 and a host computer 96 that are capable of carrying out the desired image processes. Then, the image information is successively transferred to the image-data processing section 71 of the digital copying machine 91 or the host computer 96 for each image process.

The host computer 96, which has received the request for the process, carries out the desired image process on the image information. The processed image information is returned to the digital copying machine 91 that originally made the request, through the transfer device. Then, the image-data processing section 71 of the digital copying machine 91 to which the processed image information has been returned carries out the next image process on the processed image information, if necessary. After completion of the image processes, the finally processed image information is supplied to the laser printer section 32, and the laser printer section 32 outputs a visual image.

In contrast, if the first image process has been carried out in the image-data processing section 71 of the digital copying machine 91, the processed image information is then transferred to the host computer 96. Thus, the host computer 96 carries out the next image process on the processed image information. Thereafter, the host computer 96 returns the processed image information to the digital copying machine 91 that originally made the request, through the telephone line 97 or other lines. The returned image information is supplied to the laser printer section 32 as the finally processed image information, and outputted therefrom.

Here, in the image-forming system of the present embodiment, when an instruction is given to the digital copying machine 91 and the host computer 96 through the operation panel 90 so that a plurality of image processes be carried out on image information, the PCU 74, which function as the transfer control section, selects proper apparatuses. In this case, the PCU 74, which functions as the processing-preference decision means, makes a decision as to which image process should be preferentially made, and the resulting decision is given to the PCU 74 which functions as the transfer control section.

More specifically, there are two cases depending on the contents of image processes: the amount of processed image information becomes greater than that of the image information before the process, and it becomes smaller than that of the image information before the process. In the case when a plurality of image processes are carried out by using several machines in a combined manner, if the processes are erroneously carried out in the sequence, it takes more time to transfer the image information. In particular, when the information is transferred to an external machine by using the telephone line 97 or other lines, the delay also causes disadvantages on an economic basis.

However, in the present embodiment, the PCU 74, which functions as the processing-preference decision means, properly decides the order of preference as described above. Therefore, with the above-mentioned arrangement, when the user carries out a plurality of desired image processes by using the digital copying machine 91 and the host computer 96 in a combined manner, it is possible to shorten the transferring time between the digital copying machine 91 and the host computer 96. Further, since this arrangement allows the digital copying machine 91 and the host computer 96 to operate efficiently, it becomes possible to provide an image-forming system which produces a desired visual image in a short time.

Moreover, in the image-forming system of the present embodiment, the PCU 74, which functions as the processing-preference decision means, makes a decision as to whether the amount of data after the process exceeds the amount of data prior to the process or it goes below the amount of data prior to the process if a certain image process has been carried out in the image-data processing section 71 of the digital copying machine 91. Then, if the PCU 74 makes a decision that the amount of data will decrease, the PCU 74 gives an instruction to the PCU 74 which functions as the transfer control section so that the image process in question is preferentially carried out in the image-data processing section 71 of the digital copying machine 91 and thereafter, the resulting processed image information is transferred to the host computer 96 where other image processes are carried out.

In other words, in the case when a plurality of image processes are carried out by using the digital copying machine 91 and the host computer 96 in a combined manner, when the PCU 74, which functions as the process-preference decision means, makes a decision that a certain process, such as, for example, a "reduction" process, causes a decrease in the amount of data if it is carried out in the digital copying machine 91, the PCU 74, which functions as the processing-preference decision means, gives an instruction to the PCU 74 which functions as the transfer control section as described below: The PCU 74, which functions as the processing-preference decision means, gives an instruction to the PCU 74 which functions as the transfer control section so that the image process such as, for example, a "reduction" process, is preferentially carried out in the image-data processing section 71 in its own machine, and so that the processed image information is then transferred to the host computer 96 so as to allow it to carry out other image processes, such as, for example, a "rotation" process.

In this case, since the image information, whose amount of data has decreased, is transferred to the host computer 96 through the telephone line 97 or other lines, the transferring time is positively shortened. That is, the transferring time is positively shortened as compared with the case in which: the image information is first transferred to the host computer 96; a process, such as a "rotation" process, is carried out by the host computer 96; and the data that has been subject to the "rotation" process is further subject to a "reduction" process.

Therefore, since the image-forming system of the present embodiment minimizes the amount of data to be transferred, it is possible to positively shorten the transferring time. Moreover, since the amount of data to be transferred is kept at a minimum, the amount of memory use in the external host computer 96 can be minimized, thereby making it possible to provide an efficient image-forming system.

Moreover, in the image-forming system of the present embodiment, in the case when a plurality of image processes are carried out by using the digital copying machine 91 and the host computer 96 in a combined manner, when the PCU 74, which functions as the process-preference decision means, makes a decision that a certain process, such as, for example, an "enlargement" process, causes an increase in the amount of data if it is carried out in the digital copying machine 91, the PCU 74, which functions as the processing-preference decision means, gives an instruction to the PCU 74 which functions as the transfer control section as described below: The PCU 74, which functions as the processing-preference decision means, gives an instruction to the PCU 74 which functions as the transfer control section so that the image information is preferentially transferred to the host computer 96 so as to allow it to carry out other image processes, such as, for example, a "rotation" process, and so that the processed data is then returned to the digital copying machine 91 and the image-data processing section 71 of the digital copying machine 91 carries out the image process such as, for example, an "enlargement" process, on the returned image information.

In the case when a plurality of image processes are carried out, if a process, such as an "enlargement" process, is first carried out in the designated machine, the amount of data that is to be transferred to the host computer 96 increases. This prolongs the transferring time.

In contrast, with the above-mentioned arrangement, in such a case when the amount of data that is to be transferred is expected to increase, the image information is first transferred to the host computer 96 and a process, such as a "rotation" process, is carried out by the host computer 96. Thereafter, the image information that has been subject to the "rotation" process is transferred to the digital copying machine 91, and a process, such as an "enlargement" process, is carried out on the image information by the digital copying machine 91. Thus, the transferring time is positively shortened as compared with the case in which a process, such as an "enlargement" process, is first carried out in the designated machine.

Therefore, since the above-mentioned arrangement minimizes the amount of data to be transferred, it is possible to shorten the transferring time, and also to minimize the amount of memory use in the external host computer 96; thus, it becomes possible to provide an efficient image-forming system.

[Embodiment 2]

Referring to FIGS. 16 through 18, the following description will discuss another embodiment of the present invention. Here, for convenience of explanation, those members that have the same functions as the members indicated by Figures in Embodiment 1 are indicated by the same reference numerals and the description thereof is omitted.

In the image-forming system of the present embodiment, if the same type of image-processing function is provided in both the designated machine and the external apparatus (for example, a host computer 96), either of the apparatuses that has a faster image processing and a higher processing capability is selected so as to carry out the image process in question.

For example, supposing that a digital copying machine 93 is the designated machine, both the digital copying machine 93 and the host computer 96 have "slanted-character" processing functions, as shown in Table 2. FIG. 16 shows the detailed processing capabilities with respect to the "slanted-character" processing functions of the respective apparatuses. In other words, the processing capability of the digital copying machine 93 is indicated as version 1, and the processing capability of the host computer 96 is indicated as version 2. Therefore, the host computer 96 carries out the "slanted-character" process faster than the digital copying machine 93. Moreover, with respect to the setting units, the host computer 96 has a setting unit of 1°, while the digital copying machine 93 has a setting unit of 5°. Therefore, with respect to the "slanted-character" processing function, the host computer 96 is superior to the digital copying machine 93, and can provide more detailed setting.

In this case, the PCU 74 of the digital copying machine 93 informs the user of the fact that the host computer 96 has a higher processing level. In other words, the PCU 74 informs the user that the host computer 96 can carry out the process at a higher speed, and provide a higher-level process, as compared with the digital copying machine 93. Then, the user is allowed to select either of the apparatuses, and a desired process is carried out.

Referring to the flow chart of FIG. 17, an explanation will be given of the detailed operation of the digital copying machine 93 wherein the "slanted-character" process is selected.

Figure 18A:
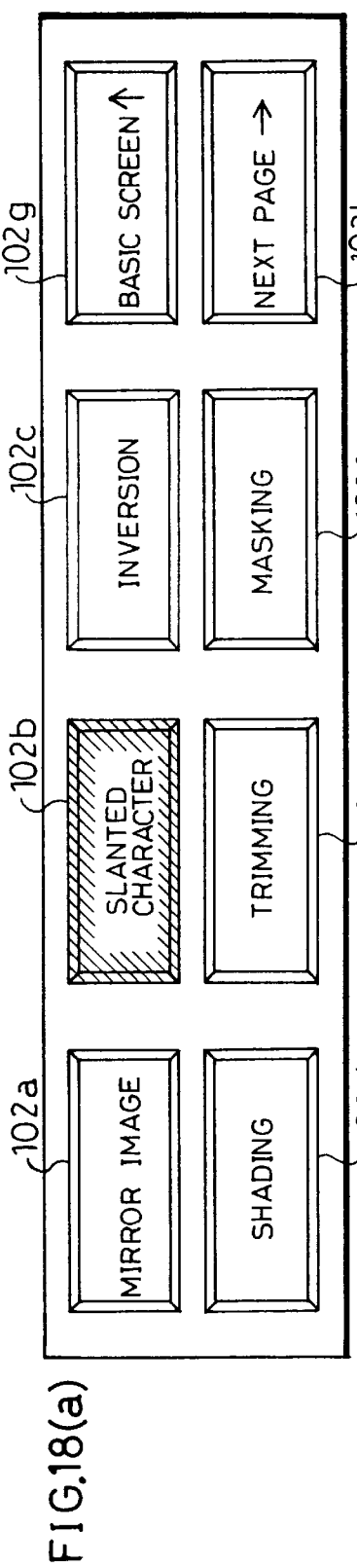
FIG. 18($a$) is a front view that shows a display state in which a "slanted character" process is selected in the first-function setting screen shown in FIG. 6($b$)

When the function-setting key 101a is pressed (S31) on the basic screen of the liquid crystal display 1 shown in FIG. 6(a), the screen of the liquid crystal display 1 is switched to the first-function setting screen as shown in FIG. 6(b). Next, on this screen, when the slanted-character setting key 102b is pressed (S32), the display region of the slanted-character setting key 102b is displayed in an inverted state, as shown in FIG. 18(a), on the screen of the liquid crystal display 1.

Figure 18B:
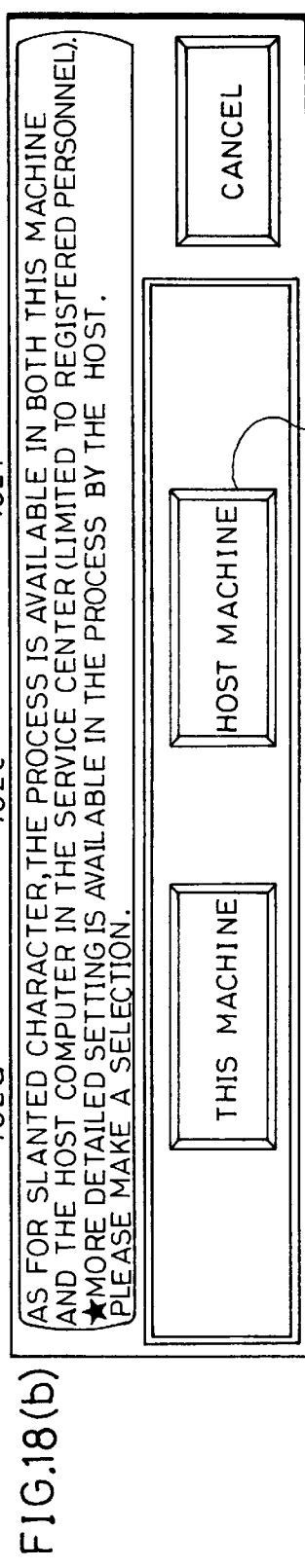

Next, the PCU 74 in the digital copying machine 93 makes a judgement as to whether or not both the designated machine and the host computer 96 have the set function (S33). In this case, since both of the apparatuses have the "slanted-character" processing function, the result of judgement at S33 is "YES". Accordingly, the PCU 74 of the digital copying machine 93 confirms the capabilities of the "slanted-character" processing functions of the designated machine and the host computer 96 (S34). Thereafter, displays are provided on the screen of the liquid crystal display 1 so as to inform that the "slanted-character" process is operable in both the designated machine and the host computer 96, and that selection should be made as to which apparatus, the machine at hand or the host computer 96, is used to carry out the "slanted-character" process (S35). This display screen is shown in FIG. 18(b).

Figure 18C:
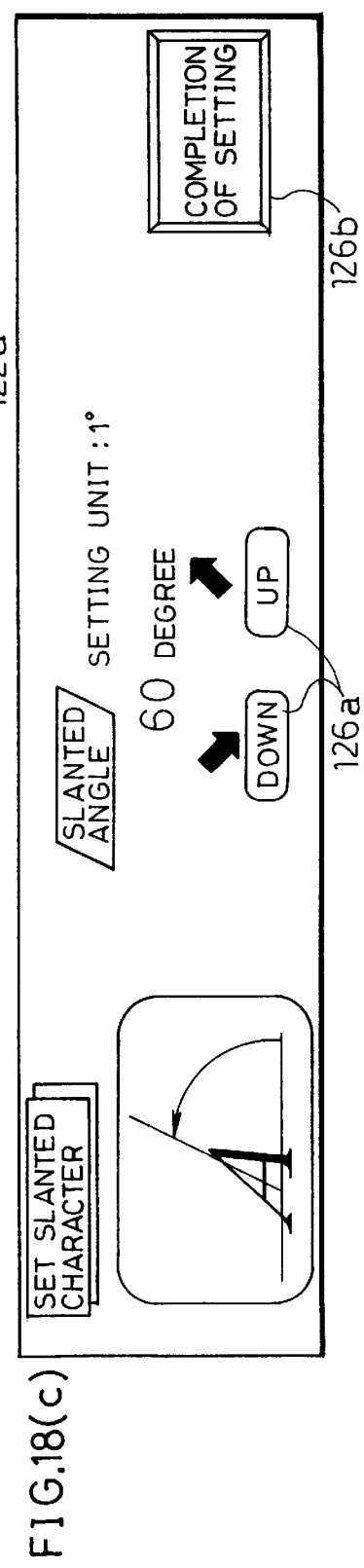

Successively, when a host-side key 122a, placed on the above-mentioned display screen, is pressed (S36), the screen of the liquid crystal display 1 is switched to a rotation-setting screen shown in FIG. 18(c). Then, the angle of "slanted character" is inputted through a slanted-angle input key 126a that is placed on the display screen. Thereafter, when a setting completion key 126b is pressed, the PCU 74 of the digital copying machine 93 scrambles the image data (S37), and the image data is successively transferred to the host computer 96 in the service center (S38).

The host computer 96, on the other hand, unscrambles the image data that has been sent from the digital copying machine 93 (S39). Next, the host computer 96 confirms the contents of process that are requested through a command code, and carries out a "slanted-character" process on the image data in accordance with the contents of the request (S40).

Upon completion of the process on the image data, the host computer 96 scrambles the image data that has been subject to the process (S41), and then returns the scrambled image data to the digital copying machine 93 that originally transmitted the image data, through a path that is reversed to the previous path (S42).

The digital copying machine 93 unscrambles the transmitted data (S43), and outputs the image data onto a sheet of paper as an image (S44).

Here, if a predetermined time has elapsed at S36 before the start key 112a is pressed (S45), the digital copying machine 93, which is the designated machine, carries out a "slanted-character" process (S46), and the sequence proceeds to S44.

In contrast, if the result of judgement at S33 is "NO", the sequence proceeds to S46, and the "slanted-character" process is carried out by the digital copying machine 93 (S46), and the sequence proceeds to S44.

As described above, in the image-forming system of the present embodiment, image information is obtained, for example, by the scanner section 31 that is installed in the digital copying machine 93 so as to read a document image. Then, either the image-data processing section 71 of the digital copying machine 93 or the image-data processing section 71 of the host computer 96 is selected so as to carry out the image process on the image information.

In this case, when the user presses the operation panel 90 to give an instruction so that a desired image process is carried out on the image information, the PCU 74 selects a digital copying machine 93 or a host computer 96 that is capable of carrying out the predetermined image process. Then, the image information is successively transferred to the image-data processing section 71 of the digital copying machine 93 or the host computer 96 for each image process.

The digital copying machine 93 or the host computer 96, which has received the request for the process, carries out the desired image process on the image information by using, for example, the image-data processing section 71. Here, if the user requests that the process be carried out by, for example, the host computer 96, the image information is transferred to the host computer 96 through the telephone line 97 or other lines. Then, the processed image information is returned to the digital copying machine 93 that originally made the request, through the telephone line 97 or other lines. Further, in the digital copying machine 93, the laser printer section 32, which has received the processed image information, outputs the information as a visual image.

In the present embodiment, when selection is made as to which apparatus, the digital copying machine 93 or the host computer 96, is used to carry out the desired image process on the image information, the PCU 74, which functions as the capability-judging means, makes a judgement as to the image-processing capability of the image-data processing section 71 of the digital copying machine 93 or the host computer 96 based on capability information. Then, the PCU 74, which functions as the capability-judging means, gives an instruction to the CPU 74, which functions as the transfer control section, as to which processing section should be used to carry out the image process, the one in the digital copying machine 93 or the one in the host computer 96.

For this reason, even in the case when both of the digital copying machine 93, which is the designated machine, and the host computer 96 have the desired processing function, one of the apparatuses that has a higher image-processing capability is selected, and the image process is carried out in the selected apparatus.

Therefore, when either the digital copying machine 93 or the host computer 96 is used to carry out a desired image process, the digital copying machine 93 or the host computer 96 is efficiently operated; thus, it is possible to provide an image-forming system that produces a desired visual image in a short time.

Further, in the image-forming system of the present embodiment, the above-mentioned capability information includes processing-speed information about the image-process in each processing section. Moreover, the PCU 74, which functions as the capability-judging means, gives an instruction to the PCU 74, which functions as the transfer control section, as to which processing section should be used to carry out the image process, the one in the digital copying machine 93 or the one in the host computer 96, in accordance with an instruction from the operation panel 90 that is based upon the processing-speed information about the image-process.

With this arrangement, when a desired image process is requested, it is possible to select either the digital copying machine 93 or the host computer 96 that has a faster processing speed. Consequently, it becomes possible to positively obtain a desired visual image in a short time.

Here, in the present embodiment, the transferring time t of image data, shown in FIG. 16, has not yet been taken into account. However, the image-forming system of the present embodiment, the PCU 74 may be designed as follows: By comparing the total time of the transferring time t, which is required to transfer the image information between the respective image-data processing sections 71 of the digital copying machine 93 and the host computer 96, and the processing time that is based on the processing speed in the image-data processing section 71 of the host computer 96, with the processing time that is based on the processing speed in the image-data processing section 71 of the digital copying machine 93, if it makes a judgement that the former time is shorter than the latter time, the PCU 74, which functions as the capability-judging means, gives an instruction to the PCU 74, which functions as the transfer control means, to transfer the image information to the image-data processing section 71 of the host computer 96 so that the processing section thereof carries out the image process on the image information, while if it makes a judgement that the latter time is shorter than the former time, the PCU 74, which functions as the capability-judging means, gives an instruction to the PCU 74 functioning as the transfer control means so that the image-data processing section 71 of the digital copying machine 93 carries out the image process on the image information, without transferring the image information to the image-data processing section 71 of the host computer 96.

With respect to the transfer of image data, the transferring time t of image data is required in an actual operation. Without taking this into account, the efficiency in the entire image-forming system might be deteriorated. Therefore, when the processing capabilities are evaluated, either the designated machine or the host may be selected by taking into account the transferring time t of image data; thus, it becomes possible to make the image-processing time faster in total, and consequently to produce a desired visual image positively in a short time.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image-forming system which has at least one image-forming apparatus and at least one image-processing apparatus as well as a transfer device that allows both of the apparatuses to communicate with each other so as to transfer information between them, said image-forming apparatus comprising:

an image-recording section for forming a visible image based on imaged information;

a processing section for carrying out predetermined limited image processing on image information;

an input section for inputting an instruction which defines selected image processes with respect to image processing;

a transfer control section which maintains function information indicating the types of image processes that are available in the image-forming apparatus and in the image-processing apparatus respectively, which selects the image-forming apparatus and the image-processing apparatus which are capable of performing the selected image processes based on the function information and the instruction from the input section to carry out the image processing on the image information, and which successively transfer the image information to the processing section of the image-forming apparatus or to the image-processing apparatus for each selected image process, and which supplies the image-recording section with the finally processed image information that has been returned thereto; and a processing-preference decision section which, upon receipt of an instruction from the input section instructing a plurality of different image processes requiring the use of both the image-forming apparatus and the image-processing apparatus in a combined manner with respect to the image information, decides which image process is to be first carried out, and gives the resulting instruction to the transfer control section, said image-processing apparatus comprising;

a processing section which subjects the image information that has been inputted through the transfer device to predetermined image processing, and returns the resulting processed image information to the image-forming apparatus through the transfer device.

2. The image-forming system as defined in claim 1, wherein said processing-preference decision section determines whether a selected image process which can be performed in said image-forming apparatus reduces or increases the amount of image information and, if the amount is decreased, gives an instruction to the transfer control section so that the selected image process is preferentially carried out in the processing section of the image-forming apparatus, and thereafter, the resulting processed image information is transferred to the image-processing apparatus where other image processes are carried out.

3. The image-forming system as defined in claim 1, wherein said processing-preference decision section determines whether a selected image process which can be performed in said image-forming apparatus reduces or increases the amount of image information and, if the amount is increased, gives an instruction to the transfer control section so that the image information is transferred to the image-processing apparatus where other processing is first carried out, and the resulting processed image information is transferred to the image-forming apparatus where the selected image process is carried out on the returned image information in the processing section of the image-forming apparatus.

4. The image-forming system as defined in claim 1, wherein said transfer control section scrambles the image information upon transferring the image information to the image-processing apparatus.

5. The image-forming system as defined in claim 1, wherein said image-processing apparatus scrambles the image information that has been processed in the processing section of said image-processing apparatus, and then returns the scrambled image information to the image-forming apparatus through the transfer device.

6. The image-forming system as defined in claim 1, wherein said processing preference decision section includes a capability-judging section which, upon receipt of an instruction from the input section instructing a predetermined image process with respect to the image information, makes a judgement as to the image-processing capability of the processing section of the image-forming apparatus and the image-processing apparatus based on capability information, and gives an instruction to the transfer control section as to which said processing section should be used to carry out the predetermined image process, the one in the image-forming apparatus or the one in the image-processing apparatus.

7. The image-forming system as defined in claim 6, wherein said capability information includes processing-speed information about the image-processing in each said processing section, and the capability-judging section gives an instruction to the transfer control section as to which said processing section should be used to carry out the predetermined image process, the one in the image-forming apparatus or the one in the image-processing apparatus, in accordance with an instruction from the input section that is based upon the processing-speed information about the image-processing in each said processing section.

8. The image-forming system as defined in claim 6, wherein said transfer control section scrambles the image information upon transferring the image information to the image-processing apparatus.

9. The image-forming system as defined in claim 6, wherein said image-processing apparatus scrambles the image information that has been processed in the processing section of said image-processing apparatus, and then returns the scrambled image information to the image-forming apparatus through the transfer device.

10. The image-forming system as defined in claim 7, wherein said capability-judging section compares the total time of the transferring time, which is required to transfer the image information between the respective processing sections of the image-forming apparatus and the image-processing apparatus, plus the processing time that is based on the processing speed in the processing section of the image-processing apparatus with the processing time that is based on the processing speed in the processing section of the image-forming apparatus, and if it makes a judgement that the former time is shorter than the latter time, gives an instruction to the transfer control section to transfer the image information to the processing section of the image-processing apparatus so that the processing section thereof carries out the image process on the image information, while if it makes a judgement that the latter time is shorter than the former time, said capability-judging means gives an instruction to the transfer control section so that the processing section of the image-forming apparatus carries out the image process on the image information, without transferring the image information to the processing section of the image-processing apparatus.

* * * * *